(12) United States Patent
Rossie, Jr.

(10) Patent No.: US 11,451,465 B1
(45) Date of Patent: Sep. 20, 2022

(54) IN-ORDER FAULT TOLERANT CONSENSUS LOGS FOR REPLICATED SERVICES

(71) Applicant: Cisco Technology, Inc., San Jose, CA (US)

(72) Inventor: Jonathan G. Rossie, Jr., Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 17/249,537

(22) Filed: Mar. 4, 2021

(51) Int. Cl.
| | |
|---|---|
| *G06F 11/00* | (2006.01) |
| *H04L 45/021* | (2022.01) |
| *H04L 47/34* | (2022.01) |
| *H04L 41/0604* | (2022.01) |
| *H04L 41/069* | (2022.01) |
| *G06F 11/07* | (2006.01) |
| *H04L 67/51* | (2022.01) |

(52) U.S. Cl.
CPC ........ *H04L 45/021* (2013.01); *G06F 11/0709* (2013.01); *H04L 41/0604* (2013.01); *H04L 41/069* (2013.01); *H04L 47/34* (2013.01); *H04L 67/51* (2022.05)

(58) Field of Classification Search
CPC ........ H04L 47/34; H04L 47/50; H04L 67/01; H04L 67/1044; H04L 67/1051; G06F 11/0709

See application file for complete search history.

(56) References Cited

U.S. PATENT DOCUMENTS

| | | |
|---|---|---|
| 7,555,516 B2 | 6/2009 | Lamport |
| 7,849,223 B2 | 12/2010 | Malkhi et al. |
| 9,201,742 B2 | 12/2015 | Bulkowski et al. |
| 9,230,000 B1 | 1/2016 | Hsieh et al. |
| 9,313,252 B2 | 4/2016 | Langworthy et al. |
| 10,191,960 B2 | 1/2019 | Hsieh et al. |
| 10,642,507 B2 | 5/2020 | Gupta et al. |

(Continued)

OTHER PUBLICATIONS

Ji, Jialin et al., Just Say NO to Paxos Overhead: Replacing Consensus with Network Ordering, 2016, USENIX (Year: 2016).*

(Continued)

*Primary Examiner* — Marc Duncan
(74) *Attorney, Agent, or Firm* — Lee & Hayes, P.C.

(57) ABSTRACT

Techniques are described for safely overwriting decided slots and in-order fault tolerant consensus logs for replicated services. Using techniques described herein, a broad class of already-existing consensus log protocols may be enhanced/extended to safely overwrite decided slots and provide in-order fault tolerant consensus logs. When changing to a different epoch of a consensus log, slots determined to be unreachable may be changed/deleted even if slots after the gap were decided. A sequencer protocol establishes distributed consensus among a group of services. The sequencer protocol provides in-order execution of messages from multiple clients, and flow control from within the sequencer protocol, without offloading de-duplicate and reorder (DDRO) logic to the application layer. Fault tolerance is provided by egress cursors and ingress cursors, which provide awareness of which specific messages from each client sender should be executed next, even if those messages are not presently in the consensus log.

20 Claims, 11 Drawing Sheets

(56) References Cited

U.S. PATENT DOCUMENTS

| | | |
|---|---|---|
| 2009/0150566 A1 | 6/2009 | Malkhi et al. |
| 2012/0239722 A1* | 9/2012 | Bolosky .............. H04L 67/1008 |
| | | 709/201 |
| 2016/0132581 A1 | 5/2016 | Hsieh et al. |
| 2019/0266176 A1 | 8/2019 | Hsieh et al. |
| 2020/0034048 A1 | 1/2020 | Gupta et al. |
| 2021/0073197 A1* | 3/2021 | Setty ................... G06F 16/2336 |
| 2022/0045955 A1* | 2/2022 | Amicangioli ....... H04L 47/6225 |

OTHER PUBLICATIONS

Felber, Pascal et al., Optimistic Active Replication, 2001, IEEE (Year: 2001).*

Ahn, Jung-Sang et al., Designing an Efficient Replicated Log Store with Consensus Protocol, 2019, USENIX (Year: 2019).*

Balakrishnan, Mahesh et al., Virtual Consensus in Delos, 2020, USENIX (Year: 2020).*

* cited by examiner

IN-ORDER FAULT TOLERANT CONSENSUS LOGS FOR REPLICATED SERVICES

TECHNICAL FIELD

The present disclosure relates generally to sequencer protocols that produce consensus logs as general mechanisms for providing services with consistent sequences of interleaved inputs from multiple senders, and more specifically to safely overwriting decided slots and providing in-order consensus logs for replicated services.

BACKGROUND

Consensus logs are a general mechanism used to provide services with a consistent, fault-tolerant sequence of interleaved inputs from multiple senders. Conventionally, sequencer protocols and the consensus logs they generate do not necessarily provide execution of messages in the same order intended by the senders. Rather, these conventional sequencer protocols enable multiple services to each execute messages in the same decided order ("consensus") of interleaved inputs provided by the consensus log. The messages themselves, however, may be out of order with respect to the order intended by the multiple senders.

Conventional sequencer protocols used to produce the consensus logs (such as Multi-Paxos, Raft, Kafka, Zab, and Viewstamped Replication) are not designed to provide either flow control or reliable in-order messaging between a client process and an application service that operates on items from the consensus log.

DESCRIPTION OF EXAMPLE EMBODIMENTS

Overview

Figure 1:
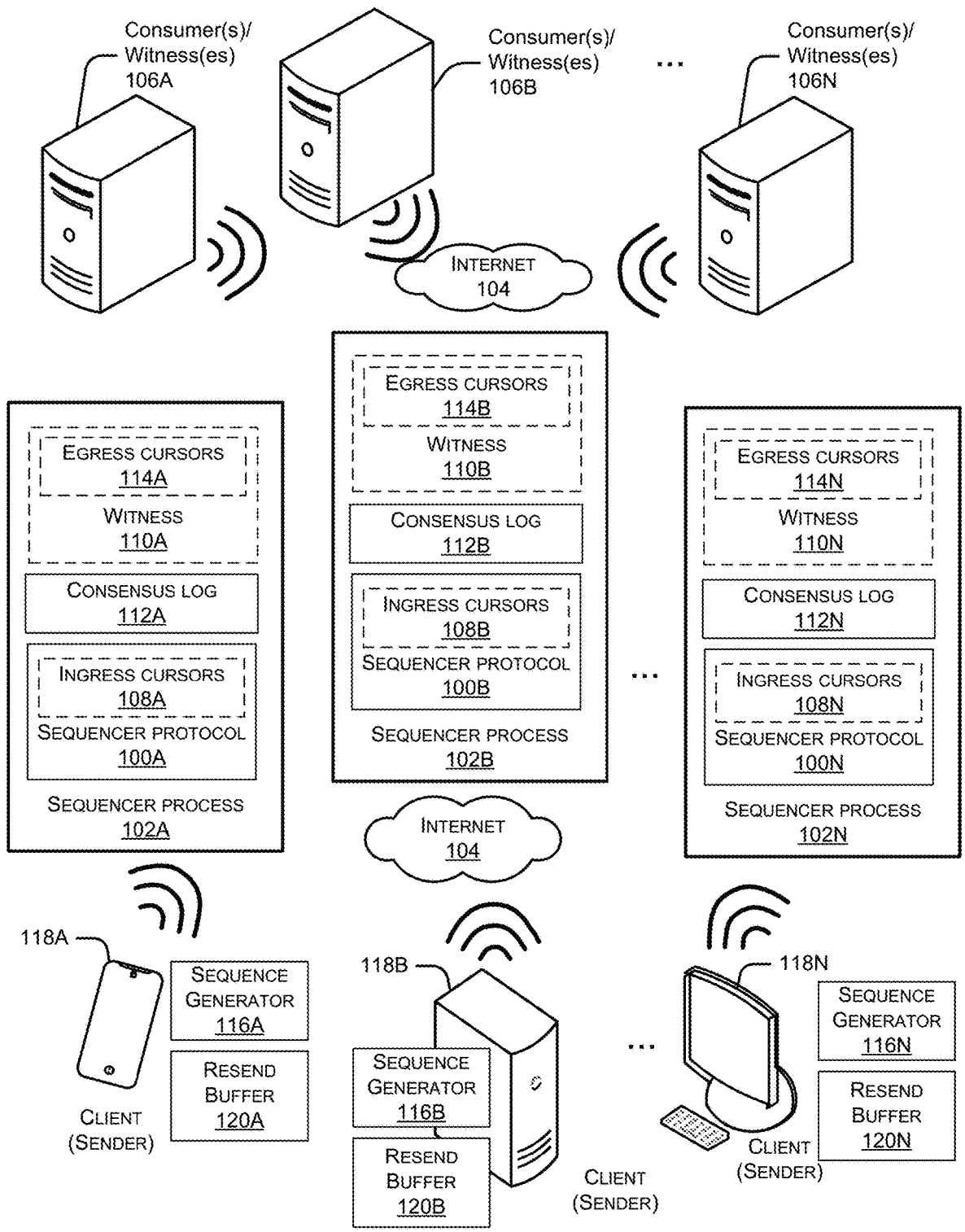
FIG. 1 illustrates an example computing environment for hosting a sequencer protocol for safely overwriting decided slots and/or for providing in-order fault tolerant consensus logs for replicated services providing fault-tolerant, reliable, in-order messaging.

This disclosure describes methods and techniques for safely overwriting decided slots and in-order fault tolerant consensus logs for replicated services. Using techniques described herein, a broad class of already-existing consensus log protocols may be enhanced/extended to safely overwrite decided slots and provide in-order fault tolerant consensus logs. Some example log protocols that may be extended may include, but are not limited to Paxos, Raft, Kafka, Zab, and the like. The log protocol extensions are directed at providing reliable in-order messaging and also other added benefits, such as flow control. Implementations of the log protocol extensions described herein can enhance various types of log protocols and their associated consensus logs. The properties and definitions below describe exemplary log protocols suitable for enhancement.

Consensus logs typically have one or more leaders that propose new values, and the leadership may change at any time. In so-called leaderless logs, there is simply a potential leadership change on every proposed log assignment. Generally, on a leader change, the new leader surveys the state of the log from the sequencer processes that coordinate to construct a consensus log. These sequencer processes 102 can unicast and broadcast messages to each other and provide survey information back to a leader requesting survey information. The survey information received may reveal some log positions as decided even though lower-numbered log positions may not have a known value. This is based on the conventional notion of safety used in proofs of correctness for consensus logs that no log position's value may change once it is decided/committed by a quorum of sequencer processes. Thus, even if the prior leader was careful to propose client messages into ordered log positions, the new leader may be forced to deal with a known gap in the log that is followed by a decided (and therefore immutable according to conventional techniques) log entry. These gaps represent message loss, and any conventional effort to restore lost messages leads to message duplication and out-of-order messages. These problems are an assumed inconvenience of consensus logs and are conventionally addressed in application layer rather than in the consensus log.

As briefly discussed, slots of a conventional consensus log that were indicated to have been previously decided by a sequencer process are assumed to be unchangeable. According to the techniques described herein, when changing to a different epoch of a consensus log, slots determined to be unreachable (e.g., after a gap) may be changed/deleted even if a portion/all of the slots after the gap were decided. According to some configurations, a possible new leader of a consensus log may propose log assignments ("alternative log assignments") that change some slots that are indicated by one or more sequencer processes to have been previously decided. In some configurations, after a possible new leader learns (e.g., via a survey of sequencer processes implementing the consensus log) log assignments for slots that are unreachable, the possible new leader proposes slot assignments to be used for the new epoch of the consensus log. When a follower sequencer process receives the proposal, the follower sequencer process stores the proposed initial log assignments along with the current log assignments of the current epoch. In some cases, a sequencer process may receive proposals from different possible new leaders. At most one potential leader will become "activated", nullifying the proposals of the others. Upon activation of a new epoch associated with one of the possible leaders, the sequencer process accepts the initial log assignments and deletes any values for slots above the range specified by the new leader.

According to some examples, messages within the consensus log may preserve the messages received from clients in the order they were sent by the clients, without message re-ordering, gaps, or duplication. In some configurations, the consensus logs may retain all of the log entries for a specified period of time and/or delete log entries at some point in time and/or in response to an event (e.g., after the log entries have been consumed by downstream consumers/witnesses).

Prior to the techniques described herein, conventional consensus logs made limited guarantees concerning the order in which client messages appear in the log. Depending on the specifics of the consensus log, a client reading from the log, which may be referred to herein as a "witness" and/or a "consumer" may encounter some combination of message loss, duplication, and reordering. These challenges arise from the interactions of different factors. For instance, prior to techniques described herein, conventional sequencer processes treated each log index as a separate consensus problem that could be solved in parallel during steady state and epoch change. This can result in the sequencer processes reaching consensus on higher-numbered log positions before lower-numbered log positions.

Using techniques described herein, a consensus log is generated that preserves the messages of each client in the order they were sent by that client, without message re-ordering, gaps, or duplication. Unlike conventional techniques, decided slots of a sequencer process may be modified (e.g., changed/deleted) thereby allowing a new leader to re-propose any lost messages in their client-requested order without introducing gaps or re-ordering. The consensus logs may retain log entries indefinitely or delete in response to some event or time.

Example Embodiments

FIG. 1 illustrates an example computing environment for hosting a sequencer protocol 100 for safely overwriting decided slots and/or for providing fault-tolerant, reliable, in-order messaging. The sequencer protocol 100 can be hosted by many different computing environments that have numerous different configurations than the example shown.

The sequencer protocol 100 is initially stored as code on at least one computer-readable device, such as a tangible non-transitory data storage medium residing in a computing device configured to execute one or more sequencer processes 102, such as sequencer processes 102A-102N, in communication with the Internet 104. FIG. 1 shows sequencer processes 102A-102N using the sequencer protocol 100 to implement the consensus log 112.

The sequencer processes 102 are a set of fault-tolerant operations that coordinate to construct a consensus log 112. These sequencer processes 102 can unicast and broadcast messages to each other. The messaging infrastructure used by the sequencer processes 102 may drop, duplicate, or re-order messages. As illustrated, the sequencer processes 102 are represented within server hardware, but sequencer processes 102 can be any process that send messages to each other used to construct the consensus log 112. The sequencer processes 102 may exist on separate hardware servers in communication with the Internet 104, as separate processors within one or more devices, as cloud entities, as serverless functions, as software-as-a-service applications, and so forth.

A consensus log 112 may consist of a theoretically infinite sequence of log positions, which may be also referred to herein as "slots". According to some examples, the log positions/slots are indexed sequentially (e.g., from 0).

Each sequencer process 102 participating in the sequencer protocol 100 evolves its own separate copy of the consensus log 112 (or the active portion of the log, since older log values may be deleted safely in some circumstances) through message exchange with other member sequencer processes 102, populating the slots in their instance of the consensus log 112 according to a sequencer protocol 100. In some examples, the sequencer protocol 100 uses quorums based on the known membership of the processes to make some decisions. Simple majority quorums are common but other approaches to quorums have been proven safe. Some consensus logs may require greater-than-majority quorums to handle Byzantine faults.

Clients 118 are represented as devices sending messages to the Internet 104 in FIG. 1, but a client 118 is any application-level process submitting a message to the consensus log 112 via at least one of the sequencer processes 102. The consensus log 112 exists as a respective instance at each sequencer process 102. The respective instances of the consensus log 112 associated with different sequencer processes 102 are not always in the same state at the same time. For instance, a sequencer process 102 designated/elected as a leader may send updates to the consensus log 112 to the non-leader sequencer processes thereby resulting in different states of instances of the consensus log 112.

When the sequencer protocol 100A allows a sequencer process 102A to conclude that consensus has been achieved for a given slot, the slot is considered "decided/committed" for that sequencer process 102A. Prior to techniques described herein, once a slot was considered decided the value for that slot never changes. In some examples, each of the sequencer processes p 102 maintains a decided-slot map (not shown) $decided_p$ that it populates using decisions learned from the consensus dialog. Conventionally, once a mapping is added to this map, it is never removed or altered. According to examples, each sequencer process 102A-102N manages one or more slot maps. Generally, a slot map is a partial function from log positions to some log values. For purposes of explanation, the mapped log positions of a slot map m may be notated as dom(m) and m[k] denotes the logged value mapped by the log position k in m. The notation { } denotes an empty map. In contexts with mutable maps, m[k]:=v signifies the operation of replacing m with a map in which k maps to v but all other elements of dom(m) map to their original values in m. If each sequencer process 102 maintains its own copy of a given map m, $m_p$ refers to the instance of map m managed by process p. For instance, sequencer process 102A maintains a slot map, sequencer process 102B maintains a slot map, and the like.

Consensus logs 112 are constructed for consumption by one or more consumers/witnesses 106. In some examples, the consensus logs 112 are consumed in log order. The consensus log 112 is a durable, fault-tolerant record of ordered log entries, making both the content and its serialization order observable to various consumers 106. In some consensus logs 112, a consumer 106 may be tightly integrated with the consensus log 112 (e.g., the consumer is a witness 110 that is part of each sequencer process 102 such as witnesses 110A-110B). In other examples, a consumer/witness 106 is separate from the sequencer processes 102.

As used herein, the term "consumer" or "witness" refers to any process/function that may consume the entries of the consensus log 112. According to some examples, a consumer/witness 106 is configured to suspend processing if it encounters an undecided slot. If a witness does not suspend processing, the witness would skip over the slot and either lose the value eventually decided there or return to that position and process the value out of order. A witness has witnessed a log position (or the value at that position) when it processes the decided value that log position, having previously witnessed every preceding log position.

The conventional safety property for consensus logs is that, for any two sequencer processes p and q hosting the consensus log 112 (e.g., p is sequencer processes 102A and q is sequencer process 102B), for all log positions i, whenever i∈dom(decided$_p$) and i∈dom(decided$_q$), it must be true that decided$_p$[i]=decided$_q$[i]. This conventional safety property, coupled with the conventional restriction on well-behaved witnesses, helps to ensure that for any two witnesses w and w' of the same consensus log 112, for all log positions i and sequencer processes p, q, if w witnesses decided$_p$[i] and w' witnesses decided$_q$[i], then w and w' witness the same value at i. This allows two witnesses to process the consensus log 112 deterministically and compute the same sequence of internal states and outputs.

As briefly discussed above, one of the sequencer processes 102 is designated as a leader, and the remaining sequencer processes 102 are followers of the leader. During the time a sequencer process 102 is a leader, at steady state, the leader is the process that proposes to assign values to slots in the consensus log 112. Voting among the follower sequencer processes 102 may or may not result in consensus. The leader sequencer process 102 is responsible for attempting to construct a gapless sequence of decided slots but can propose an assignment for slot i+k for k≥1 before witnessing an assignment for slot i, allowing the group to run consensus on multiple slots in parallel, under the assumption the leader will continue to drive consensus for slot i should earlier attempts fail. This can result in gaps in the log in which a decided slot may occur after the gap.

To assist in preventing the leader sequencer process 102 from being a single point of failure for the protocol 100, a mechanism that implements fault detection and leader election may be used. Many types of mechanisms may be used. In other configurations, the protocol 100 may also allow changes in membership. A change in membership, such as adding or removing participating processes, is known as a reconfiguration, and may not be supported by the protocols that may be used according to techniques described herein.

As illustrated in FIG. 1, clients 118 are configured to send messages to be included within the consensus log 112. For example, clients 118A-118N may send data to be included in consensus log 112. Messages between clients 118 and sequencer processes 102 may be lost, duplicated, or re-ordered by the messaging infrastructure. In some examples, each client 118 has a unique client identifier that requests the consensus log 112 to serialize commands into the log. According to some configurations, clients 118 maintain a resend buffer 120 that includes a copy of messages that are sent by the client 118 to be included within a consensus log 112. In these examples, if requested by a sequencer process 102, a client 118 may re-send any messages within the client's resend buffer 120. In some cases, messages may be removed from a client's resend buffer 120 upon receiving an acknowledgement that the message has been received and processed for inclusion into the consensus log 112. As will be discussed in more detail with regard to FIG. 3, according to some configurations, a client 118 may not maintain a resend buffer 120, and/or a sequence generator 116.

As discussed in more detail below, the sequencer processes 102 each maintain an instance of the consensus log 112 and other data. In some configurations, each sequencer process 102, such as sequencer process 102N includes a witness 110N (that may include egress cursors 114N), that uses the decided-slots map generated by sequencer protocol 100N (that may include ingress cursors 108N), to witness the consensus log 112N in-order. The egress cursors 114N indicate what messages have been witnessed from each client (e.g., by witness 110 and/or consumer 106). The ingress cursors 108 indicate a next expected message for each of the clients 118. As discussed in more detail below (See FIG. 4 and related discussion), when the consensus log 112 is generated to be in-order, the clients 118 specify the order in which their messages are to appear in the consensus log 112. According to some examples, a client 118A uses a sequence generator 116A to assign a message indicator for the message to be included in the consensus log 112.

In some configurations, the sequencer process 102N is expecting the next message to be the next number in a monotonic, continuous sequence numbers (e.g., starting at zero). For instance, if sequencer process 102N has received message assigned "2" from a client 118 then the next message indicator is "3". According to some examples, the sequencer process 102N will not place a message received from a client 118 within the consensus log 112 unless the message is in-order from that client 118.

In some examples, each sequencer process 102, such as sequencer process 102N maintains a log indicator (not shown) that identifies a lowest-unassigned variable that holds the lowest log index that has no assigned client message, decided or otherwise, from any of the clients 118. If the leader 102N sees a client message that it can verify is in-order and non-duplicated, it proposes this message to the other sequencer processes (in the current epoch) at this lowest-unassigned index and increments the index to the next log position. The sequencer processes may also store other data, as discussed in more detail below.

Upon reconfiguration (as discussed in more detail below), a new leader may survey the remaining sequencer processes 102 to obtain information about the state of the instance of the consensus log 112 associated with each of the sequencer processes 102. The survey information received from the sequencer processes 102 includes information relating to the state of the consensus log 112 maintained by each of the sequencer processes 102. In other examples, the survey information also includes egress cursors 114 information that indicates what messages have been witnessed by witness 110 and/or consumer 106. The new leader uses this information to propose log assignments to be used in a new epoch of the log.

According to some configurations, a possible new leader of a consensus log may propose log assignments that change some slots that are indicated by one or more sequencer processes to have been previously decided. In some examples, after a possible new leader learns (e.g., via a survey of sequencer processes implementing the consensus log) log assignments for slots that are unreachable, the possible new leader proposes, via a propose_succesor_state message (described in more detail below), initial slot assignments to be used for the new epoch of the consensus log. When a sequencer process receives the proposal, the sequencer process stores the proposed initial log assignments along with the current log assignments of the current epoch. In some cases, a sequencer process may receive proposals from different possible new leaders. Upon activation of a new epoch associated with one of the possible leaders, the sequencer process 102 accepts the initial log assignments and deletes any values for slots above the range specified by the new leader.

Figure 2:
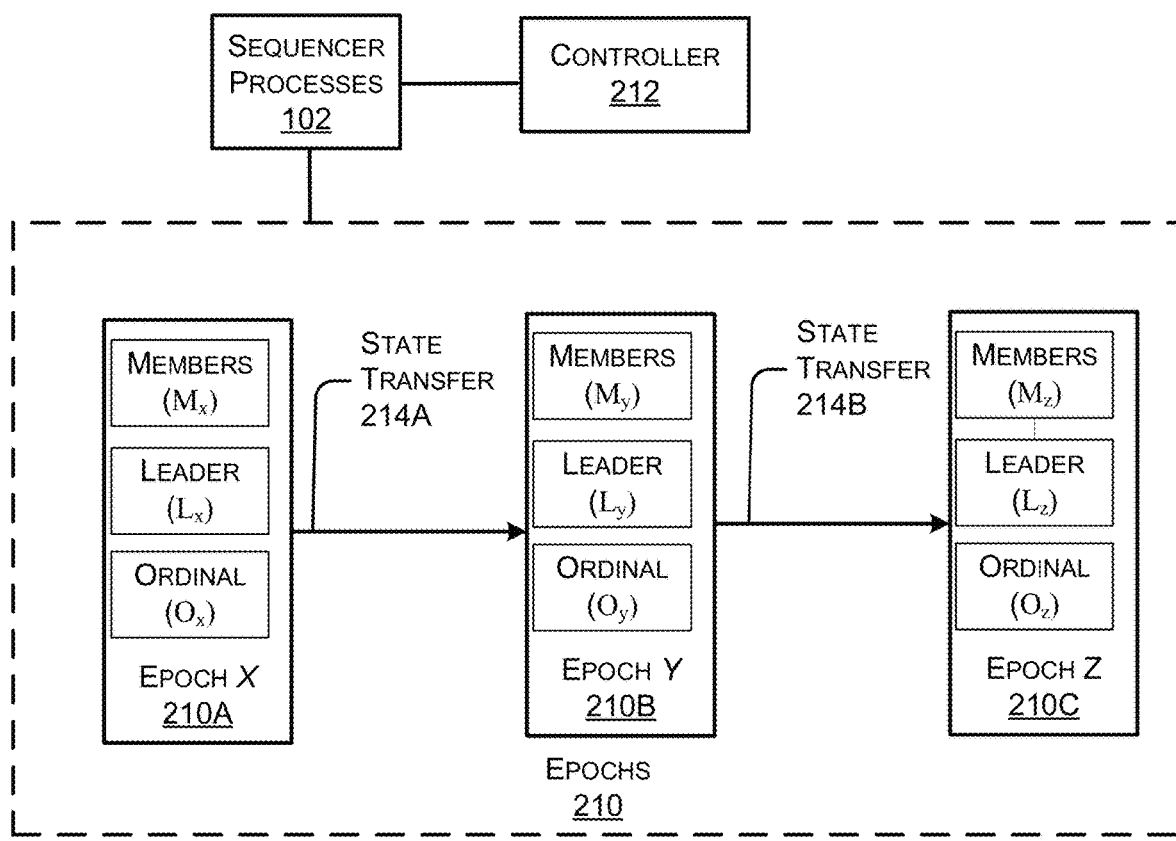
FIG. 2 illustrates the use of epochs for state transfers associated with the consensus log.

FIG. 2 illustrates the use of epochs for state transfers associated with the consensus log 112. According to some configurations, the sequencer protocol's operation over time is an unbroken sequence of non-overlapping epochs 210 that define the membership and leadership of the sequencer processes 102 participating at that time. These epochs construct a single consensus log 112. The beginning of a consensus log 112 may start with an initial "null" epoch in which no log positions are decided by any process and the quorum is { }.

As an example, let x represent epoch X 210A, y represent epoch Y 210B, and z represent epoch Z 210C of a consensus log 112, where x is the first epoch, y is the second epoch that follows x which may be stated as x<y, and z is the third epoch that follows y. In such cases we may write x<<z to indicate z is a transitive successor of x.

Different protocols may implement the chaining of epochs 210 in different ways, but the leader of a new epoch implements a selected protocol to safely handoff from the prior epoch.

The process of switching from an epoch to a new epoch may be referred to herein as "state transfer". For example, from epoch X 210A to epoch Y 210B is state transfer 214A and from epoch Y 210B to epoch Z 210c is state transfer 214B. According to some configurations, the member sequencer processes 102 (e.g., $M_x$, $M_y$, and $M_z$) of the old epoch stop making consensus decisions so that a new leader (e.g., $L_x$, $L_y$, and $L_z$) can survey the members of the old epoch with the assurance that the old epoch will not change state after responding to the survey in any way that would contradict its previous response.

Generally, the new leader sequencer process 102 processes a read quorum of survey responses to obtain a snapshot of the consensus state of the old epoch. The new leader transfers prior consensus decisions to a write quorum of the new epoch. If the new epoch has different members than the old epoch, and if the log uses externally activated reconfiguration (described below), the new leader informs an external controller (not shown) that state transfer is complete and awaits activation from the controller. The new leader is now activated and can begin driving new consensus decisions among members of the new epoch.

In some configurations, each epoch x has an associated scalar ordinal $O_x$ and that ordinals conform to epoch chaining such that x<<y implies $O_x<O_y$. The internal structure of ordinals and the definition of $O_x<O_y$ are unspecified as many realizations exist in practice.

Conventional reconfiguration approaches generally include self-activated reconfiguration and externally activated reconfiguration. With self-activated reconfiguration, chaining is implemented by having the old epoch include, among its decided values, a special command that specifies reconfiguration details such as the highest log position at which the old epoch can make a consensus decision and the members of the successor epoch.

According to some examples, in self-activated reconfiguration, each of the sequencer processes 102 run their own witness process that is configured to execute reconfiguration commands. In this form of reconfiguration, exemplified by Stoppable Paxos, the successor epoch is predetermined by the predecessor epoch and is therefore automatically self-activated. For example, when a new leader completes state transfer from the old epoch to the new one, it can immediately begin proposing new log assignments in the new epoch. While this approach has the simplicity of not using an external controller to activate each new epoch, it has the drawback that the old epoch must commit to the membership of its successor epoch before there is evidence that the new epoch can safely receive the state of the old epoch. If faults prevent the new epoch from creating a durable copy of the state, the log cannot safely continue without some form of external reconfiguration.

With externally activated reconfiguration, chaining is implemented by having some outside controller (e.g., an "orchestrator", "oracle", . . . ) orchestrate the handoff between the old epoch and the new epoch. This approach has the benefit that the orchestrator can stop the prior epoch and attempt as many successor epochs as necessary to find one that is able to create a durable copy of the state and begin making new consensus decisions. The approach is exemplified by Vertical Paxos, and Viewstamped Replication Revisited.

In general, the external controller 212 is configured to perform the following actions. When the controller 212 starts a new consensus log, a max_epoch variable is set to the null epoch, a max_epoch_ord variable is set to the ordinal of the null epoch, and an empty map successor is created that maps each reconfigured predecessor epoch to its successor epoch. When the controller 212 determines to reconfigure to a new epoch, supposing the current value of max_epoch is x, the controller 212 performs the following steps while maintaining the property that max_epoch $\notin$ dom(successor).) The controller 212 specifies a new provisional successor epoch y for prior epoch x with initial leader $L_y$ and ordinal $O_y$>max_epoch_ord, sets max_epoch_ord :=$O_y$, and instructs $L_y$ to attempt to transfer state from $M_x$ to $M_y$.

When the controller 212 receives a message from a prospective successor epoch leader $L_y$, indicating it has completed state transfer, if $O_y$=max_epoch_ord, it may (at its discretion) set this as the successor by setting successor [max_epoch] :=y and max_epoch :=y. The controller 212 then informs $L_y$ that it can begin making consensus decisions (i.e., the new epoch y is activated.)

Figure 3:
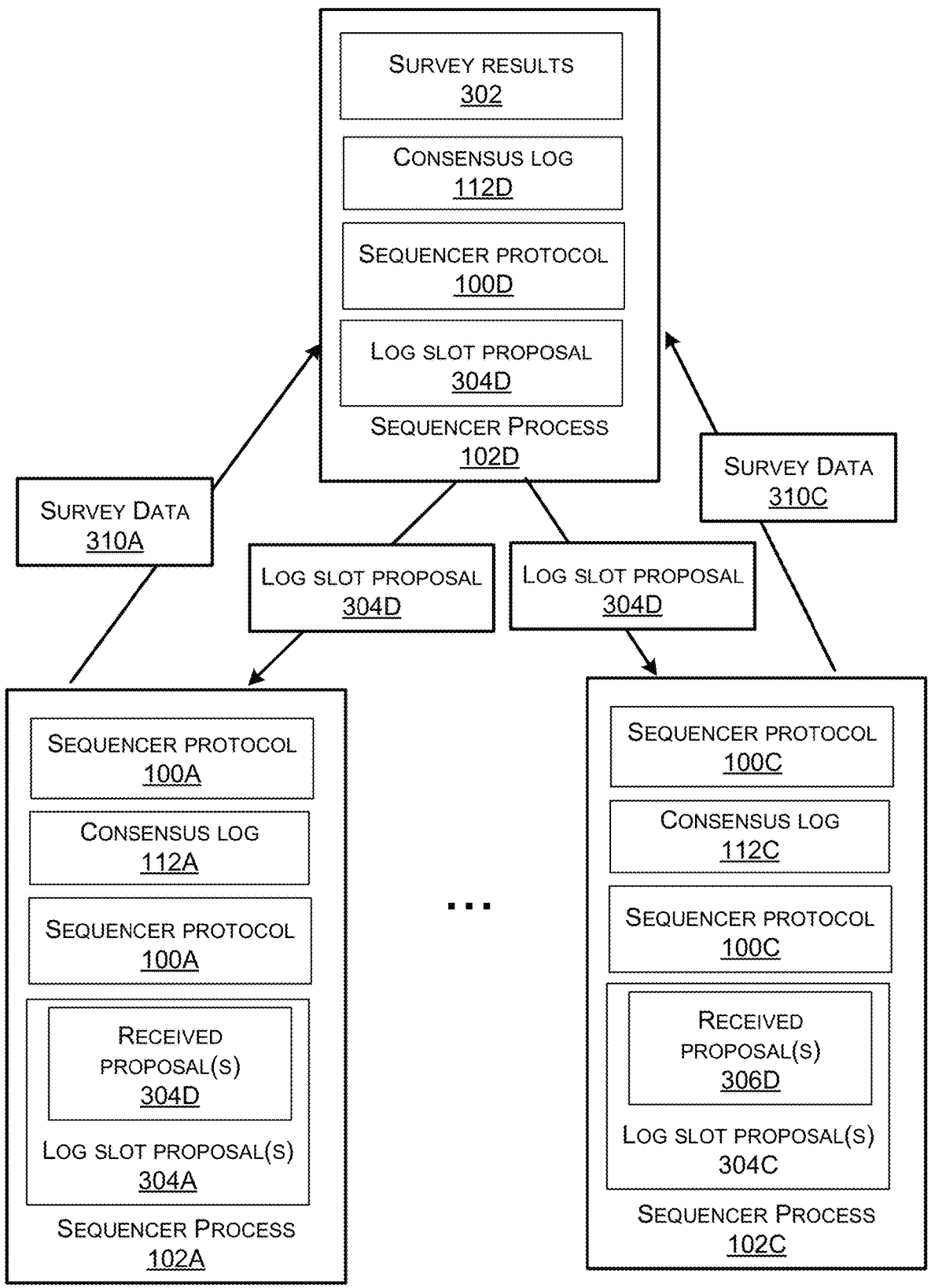
FIG. 3 illustrates a mechanism for safely altering a consensus log so that log positions conventionally deemed decided and therefore immutable in one epoch may safely be assigned different values, or no values, or deleted, in a successor epoch.

FIG. 3 illustrates a mechanism for safely altering a consensus log 112 so that log positions conventionally deemed decided and therefore immutable in one epoch may safely be assigned different values, or no values, or deleted, in a successor epoch.

In the transition from one epoch, such as epoch X, to a successor epoch, such as epoch Y, there is a period in which neither epoch X nor epoch Y is making consensus decisions. In this period, the proposed/possible leader Ly, such as sequencer process 102D, of the successor epoch Y performs its state transfer using read quorums (e.g., survey data 310) received from other sequencer processes 102 to analyze the (now frozen) decisions of epoch Y and any predecessor epochs.

In some examples, consensus logs 112 have an "active window" that is the portion of the consensus logs 112 where consensus decisions are being actively decided. Slots below the active window may or may not be retained. According to some configurations, the leader $L_y$ (leader 102D) knows or learns, to a safe approximation, the lowest active log index $A_X$ when it receives survey data 310 from the other sequencer processes 102 completes its state-transfer survey based on the survey data 310 received from the other sequencer processes 102. In some examples, $A_X$ may be 0, meaning that the entire consensus log 112 is transferred to the new epoch Y.

During state transfer, $L_y$, such as sequencer processor 102D, performs a conventional analysis, based on a survey of the members of epoch X (e.g., $M_x$), to discover the set of potentially-decided log positions: $D_X=\{i \geq A_X | \exists (p \in M_x)$ where it is possible that i∈decided$_p$} wherein A$_X$ is the lowest active index of x for purposes of state transfer. This set is not assumed to be continuous. There may exist i<j where j∈D$_X$∧i∉D$_X$ wherein D$_X$ is the indexes of potentially decided slots of x. According to some examples, L$_y$ populates a map survey$_X$ that maps log positions in D$_X$ to commands, so that dom(survey$_X$)=D$_X$. These commands represent the state L$_y$ would conventionally transfer to the members M$_y$. Conventional consensus logs compute D$_X$ and survey$_X$ using only a read quorum of survey responses.

According to some configurations, the leader sequencer process 102D determines the log slots that are "reachable" based on the survey data 210A. A log position j is reachable in x if ∀(i≤j), i∈D$_X$ or i<A$_X$. Equivalently, a log position j is reachable in x if ∀(i≤j), i∈dom(survey$_X$) or i<A$_X$. Since a well-behaved witness processing the log witnesses only reachable commands, the possible leader 102D L$_y$ can safely conclude that no witness of the log as decided through epoch x could have witnessed any command at an unreachable log position.

The sequencer process 102D may also identify the lowest unreachable log position or "gap". Let G$_X$∉D$_x$ be the log position such that ∀(i<G$_X$), i∈D$_X$ wherein G$_X$ is the "gap" (lowest unreachable) index of x when the epoch X is frozen. In the situation when the consensus log 112 has no decided log positions i≥A$_X$ then G$_X$=A$_X$. According to some configurations, the leader sequencer process 102D determines the lowest unreachable log position above which there are no potentially-decided log assignments in x.

According to some configurations, the leader L$_y$ may also determine the "frontier" of the log. When F$_X$≥G$_X$, the frontier is the least log position such that ∀(i>F$_X$), i∉D$_X$ wherein F$_X$ is the frontier of x when frozen. In conventional logs, when L$_y$ computes the state transfer from M$_x$ to M$_y$, the log positions at or above the frontier can be ignored. Observe that if every i∈D$_X$ is reachable, then F$_X$=G$_X$. It is the existence of unreachable decided slots that creates the gap.

Conventional consensus logs typically use one of two strategies for state-transfer surveys. In one model, exemplified by "Vertical Paxos I" in [Vertical Paxos], the survey request from L$_y$ to M$_x$ includes the new leader's epoch ordinal O$_y$ but not the epoch ordinal O$_x$ of the predecessor epoch. In this model, each respondent replies by computing for each log position the log assignment regardless of whether it resulted from a proposal of Lx. This means the surveys may include log assignments stored under any O$_w$≤O$_x$. The leader L$_y$ gathers these survey responses and constructs a model of the consensus state of x. In an optimized model, exemplified by "Vertical Paxos II" in [Vertical Paxos], the survey request from L$_y$ includes both O$_x$ and O$_y$, and respondents construct their surveys using only log assignments stored under O$_x$. Again, the leader L$_y$ gathers the survey responses and constructs a model of the consensus state of y, but the knowledge that all responses contain only O$_x$ assignments simplifies the processing because, in this form of consensus with well-behaved processes, no two surveys will disagree on the value of any decided slot.

According to configurations, the leader L$_y$ performs a survey request that includes the ordinals of both the new epoch O$_y$ and the prior one O$_x$. In some examples, a sequencer process 102 does not request a survey of prior epoch y unless that epoch was activated. In other examples, a sequencer process 102 receiving a request for a survey of a prior epoch determines whether the request is authorized (e.g., the request includes the authorization and/or the sequencer process accesses some other source). A sequencer process 102 that receives a survey request that names O$_x$ as the previous epoch ordinal can therefore assume that O$_x$ was allowed to make consensus decisions.

According to some configurations, a leader 102D does not propose different values (e.g., log slot proposal 304D) to different sequencer processes 102A, 102C for the same slot in the same epoch. As such, no two well-behaved sequencer processes will respond to a state-transfer survey for the same epoch with different values for the same slot. This approach is applicable to logs in which the processes are not assumed to be well-behaved if the survey is enhanced with Byzantine Fault Tolerance using standard mechanisms, essentially detecting and eliminating messages that imply incorrect behavior by any of the processes.

As described herein, the conventional safety property for consensus logs is unnecessarily strong when a goal is to ensure no two witnesses can witness a different command at the same log position. According to some examples, safety may be stated as: for any two well-behaved witnesses w and w' of the same consensus log, for all log positions i and sequencer processes p, q, if w witnesses decided$_p$[i] and w' witnesses decided$_q$[i], then w and w' witness the same value at i.

According to configurations, when a sequencer process 102 L$_y$ is transferring state to its new epoch y from x it can alter the transferred state to safely delete commands at arbitrary log positions i∈D$_X$ where G$_X$≤i≤F$_X$ or replace them with arbitrary new commands, requiring a unanimous quorum before activation of the new epoch.

Unanimous quorums rarely improve fault tolerance, and often impair liveness. In some configurations, however, unanimous quorums are used to help ensure that later epochs do not diverge. A lack of unanimous quorum may indicate that the new epoch contains untimely members that indicates that a different successor epoch with only timely members should be used. While this may delay reconfiguration until such an epoch can be found, it can prevent later liveness issues that might arise from activating a ballot with untimely members.

According to some configurations, a potential successor epoch Y is restricted from making any consensus decisions before the new leader's overwrites are safely replicated to a unanimous quorum of M$_y$ of the new epoch. In a conventional consensus log that does not allow a previously decided slot to be altered, each sequencer process has distinct responsibilities, such as confirming receipt of log assignments proposed by the leader, ignoring log assignments that would result in changing a decided slot's value, and responding to state-transfer surveys from the leaders of prospective new epochs. Conventionally, once a member of M$_y$ has accepted a log assignment, it must report the log assignment in its survey responses and also reports—explicitly or implicitly—those slots for which it has no accepted log assignment.

Conventionally, a new leader L$_y$ proposes state transfer to the new epoch's members M$_y$ using the same message type it uses to propose log assignments at steady state. Instead of using the same message type to propose log assignments as in conventional consensus logs, a different message type is used to signify the initial log-assignments proposed by a new leader in the execution of its state-transfer phase. According to some configurations, the message to propose log assignments during state transfer may be referred to herein as a "propose_successor_state" message. In some examples, the propose_successor_state message includes the identity of the sender L$_y$, the new epoch ordinal O$_y$, the prior epoch ordinal $O_x$, a map of log assignments proposed by $L_y$ that may include arbitrary replacements for log positions $i \geq G_y$, and the lowest log position above the state transfer's range. A propose_successor_state message tacitly proposes that the log should not have any information about any log positions above the state transfer's range.

Each sequencer process 102 maintains knowledge of the highest epoch for which it has proof of activation. Not every sequencer process 102 will witness proof when an epoch is activated, but whenever a sequencer process does witness such proof, it updates its memory of the highest activated epoch. A sequencer process 102 may, for example, assume an epoch was activated if it sees the epoch ordinal in any of the following contexts. The prior epoch number is identified in a propose_successor_state message, or as the current epoch number in a steady state message proposing log assignments (e.g., Paxos 2a "propose" messages) or a steady state message acknowledging proposed log assignments (e.g., Paxos 2b "accept" messages). In some configurations, each sequencer process maintains a variable "max_activated" that is initially the ordinal of the null epoch and is updated to the highest activated whenever the process witnesses a new higher activated ordinal in any context.

According to some examples, the members $M_y$ (e.g., sequencer processes 102A, 102C, and 102D) treat any propose_successor_state message whose prior epoch $O_x$ is greater than max_activated as a provisional sucessor to $O_x$. When a propose_successor_state message is received by a sequencer process 102, the sequencer process 102 stores in log slot proposals 304, and acknowledging the log assignments included in the log slot proposal 304 (by unicast reply to $L_y$) but does not treat these log assignments as decided until some later event proves that $O_y$ has been activated. In some examples, a sequencer process 102 can store multiple provisional log slot proposals for the same prior epoch, each with its own epoch ordinal and proposed log assignments. For instance, sequencer process 102A may store a log slot proposal 304D received from sequencer process 102D, as well as other log slot proposals 304 received from different possible leaders.

It suffices for each process to maintain a variable successors holding a set of propose_successor_state messages whose prior epoch matches max_activated. In some configurations, $L_y$ will not send two different propose_successor_state messages for the new epoch Y. Successors[$O_x$] may denote the propose_successor_state in successors that proposes new epoch x, and dom(successors) as the set of all $O_z$ where successors contains a propose_successor_state with new epoch z.

According to some examples, the provisional successors in each sequencer process 102 are part of the durable memory of the cluster. Once a sequencer process p 102 has acknowledged receipt of a propose_successor_state message, it remembers its slot assignments for as long as they may be needed. It is possible that p may receive and acknowledge a propose_successor_state message for new epoch $O_y$, and never see another message concerning $O_y$ until it receives a state-transfer survey naming $O_y$ as the prior epoch, which would be proof that $O_y$ had been activated. Process p can respond to a state-transfer survey for an unactivated epoch $O_y$ by first treating $O_y$ as activated using the provisional data from successors$_P(O_y)$. The acknowledgement it previously sent for the propose_successor_state was an explicit promise to respond to these survey requests using the data in that state-transfer. If p learns an epoch $O_z$>max_activated has become activated, it checks whether $O_z \in$ dom(successors$_P$). If so, this is proof that the proposed log assignments stored in successors$_P[O_z]$ belong to an activated epoch. In some configurations, it performs the following actions atomically, such that no process can witness the log in an intermediate state where only some of the updates have been applied.

One action that occurs atomically is that the proposed log assignments in the activated log slot proposal 304 become immediately decided, since activation is proof that all members of $M_Z$ received and stored the same propose_successor_state data. Another action is that the data for any log position above the range of the proposed state transfer is deleted in some examples. This includes any decided slots and any information pertaining to in-flight consensus for slots not yet decided. In particular, if p receives a state-transfer survey request immediately following this deletion, it does not report information for slots above the top-of-range index specified in the propose_successor_state message. Finally, regardless of whether or not $O_z \in$ dom(successors$_P$), process p should set successors$_P$ to { } and set max_activated to $O_z$.

With these mechanisms in place, a new leader $L_y$ of a prospective successor to epoch X can safely construct and send a propose_successor_state message in which every slot i in the range $A_X \leq i < G_X$ has the value survey$_X$(i) and the unreachable slots $j \geq G_X$ are either excluded from the proposal or contain arbitrary commands chosen by $L_X$. When $L_y$ receives a unanimous quorum of acknowledgements from $M_y$, it knows state has been transferred and can either proceed to steady state or, in the case of externally-activated reconfiguration, inform the controller and await activation.

For example, $L_y$ might replace the slots from the gap to the frontier with NO-OP using a loop, such as:

```
var slots_to_propose={ }
var top_of_range=A_X
for (; top_of_range<G_X; top_of_range++)
  slots_to_propose[top_of_range] :=survey [top_of_range]
for (; top_of_range<F_X; top_of_range++)
  slots_to_propose[top_of_range] :=NO-OP
make_propose_successor_state    (top_of_range,slots_to_propose)
```

Observe, however, that replacing with NO-OP is unnecessary because it is sufficient for $L_y$ to simply indicate that $G_X$ is the lowest index not included in the state transfer range, which will cause members of $M_y$ to truncate all data for slots $j \geq G_y$ when they learn $O_y$ is activated

```
var slots_to_propose={ }
var top_of_range=A_X
for (; top_of_range<G_X; top_of_range++)
  slots_to_propose[top_of_range] :=survey[top_of_range]
make_propose_successor_state    (top_of_range,slots_to_propose)
```

To further clarify the function of the multiverse of successor epochs, the following pseudo-code demonstrates how to maintain max_activated and successors

```
// Persistent variables in the the sequencer process
var successors :={ }
// Assuming ORD_NULL is the null epoch's ordinal
var max_activated :=ORD_NULL
// Function to collapse a multiverse to the one activated proposal
function perhaps_collapse (activated_ord)
  if (activated_ord>max_activated)
    if (∃m∈successors where m. new_ord=activated_ord)
      // Details depend on the consensus protocol, but the
      // net effect is to erase any trace of information about
      prior
```

// attempts to associate any value with log positions
above those in m.
delete_all_slot_data_above (max_proposed_position (m))
// Broadcast the conventional Accept message, such
// as Paxos 2b messages, enhanced to atomically accept
a batch slots.
broadcast_bulk_accept (m)
// Regardless, we learned a higher max_activated
max_activated :=activated_ord
successors :={ }
// Event handler for propose_successor_state messages
receive m=propose_successor_state (src, new_ord, prev_ord, slots)
// Any prev_ord was necessarily activated
perhaps_collapse (prev_ord)
if (prev_ord≥max_activated)
successors :={m}∪successors
// Unicast acceptance of the batch to the leader that
proposed it unicast (src, accept_latch_only (self, m))

In addition to calling perhaps_collapse in the handler for propose_successor_state, various conventional flows are enhanced to call perhaps_collapse when they have evidence that an epoch is activated. For example, in Vertical Paxos II terms, the following fields might be assumed to always represent activated epochs (assuming state transfer uses propose_successor_state rather than the usual 2a (Propose) message). When the message type is "new-ballot", or "1a (aka, Prepare)" the field that is implied accepted is "prevBal". When the message type is "2a (aka, Propose)", or "2b (aka, Accept)" the field that is implied accepted is "bal".

Figure 4:
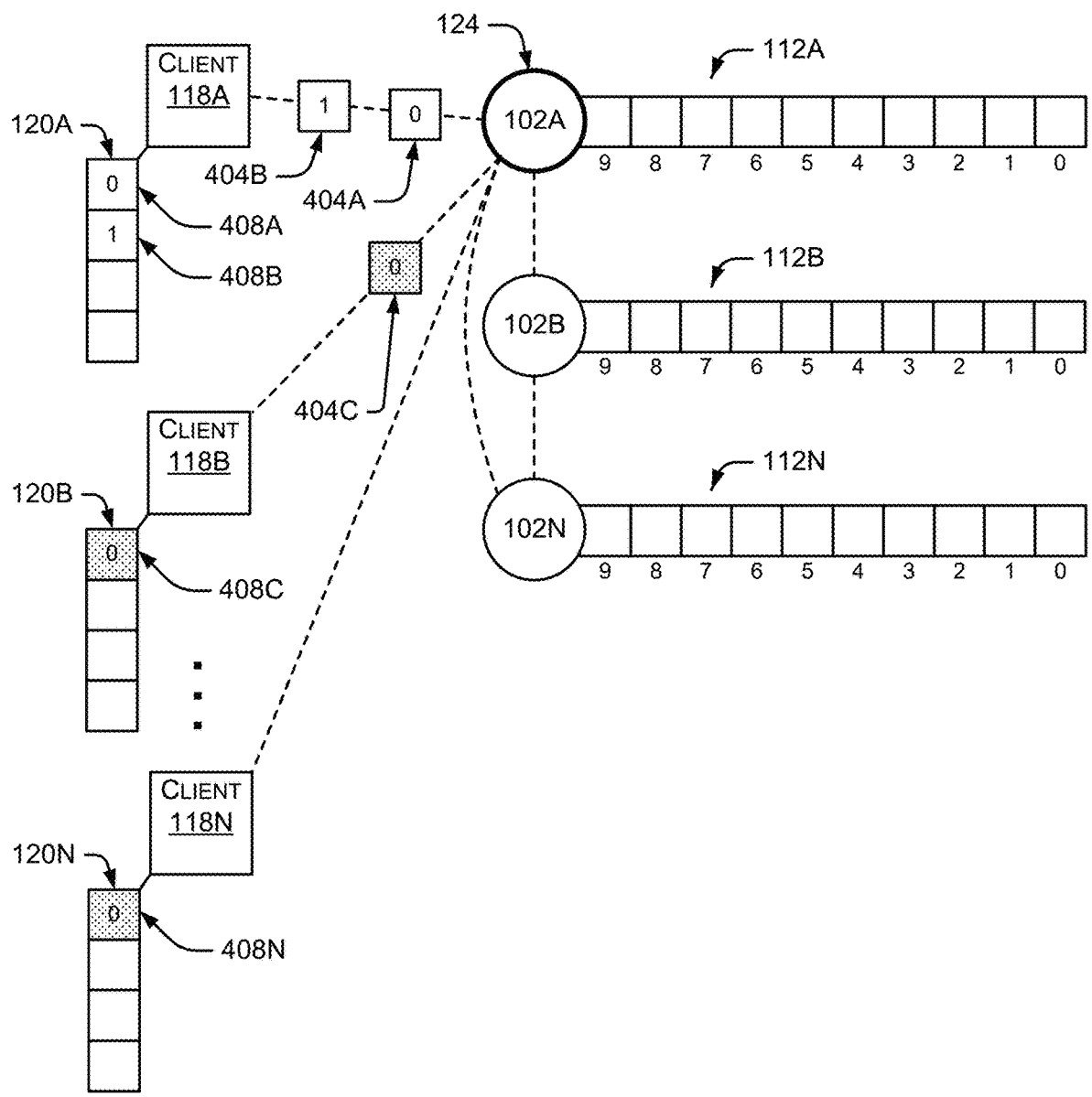
FIG. 4 illustrates client-requested message ordering for including in a consensus log.

FIG. 4 illustrates client-requested message ordering for including in a consensus log 112. As illustrated, clients 118 specify the order in which their messages are to appear in the consensus log 112. In some configurations, a client 118 submits a message 404 to the consensus log 112 by first wrapping it an envelope of the form ((c, s), m), where c is a unique client identifier, s is a unique sequence number, and m is the message. A client 118 sends this envelope to one or more sequencer processes 102 hosting the consensus log 112 and retains a copy of the envelope in a dedicated resend buffer 120. In the current example, the clients 118 are sending the messages to sequencer process 102A that has been designated as the leader 124.

According to some examples, each client 118, such as clients 118A-118N, maintains a counter and assigns monotonic, continuous sequence numbers (e.g., starting at zero) to its outgoing messages 404, such as using sequence generator 116 illustrated in FIG. 1. The sequence numbers indicate the order in which the messages should appear in the consensus log 112. As illustrated, client 118A has sent message 404A having a sequence number of 0, and message 404B having a sequence number of 1. Client 118B has sent message 404C having a sequence number of 0, and client 118N has not sent any messages.

To support reliable delivery of the messages 404, each client 118 retains each message 404 that was sent in a resend buffer 120 (or some other memory or storage) until receiving a confirmation (e.g., an acknowledgement (ACK) message) in the form ACK(c, n) from a sequencer process 102 of the consensus log 112 indicating that n is the lowest sequence number from client c that is not yet acknowledged. On receiving such an ACK, the client 118 ("c") receiving the ACK message may delete the messages from the resend buffer 120 whose sequence number is less than n.

According to some examples, an ACK message is not sent to a client 118 until its log position is sequentially reachable.

As discussed herein, a log entry that is sequentially reachable does not include gaps. The consensus log 112 may ACK each message 404 as it becomes sequentially reachable or may delay sending ACK messages since a single ACK can acknowledge a range of messages 404 from the same client 118.

A client 118 may also receive other messages. For example, a client 118 may receive a NACK message that informs the client 118 that the lead sequencer process 102 has seen a gap and requests earlier messages to be resent. A client 118 receiving the NACK message (e.g., in the form NACK(c, n)) from the consensus log as a request to resend (in-order) the messages from the resend buffer 120 of the client 118 whose sequence numbers are less than or equal to n. The sequence number n is the leader's "next needed" sequence number as determined by its ingress cursor for client c. A NACK message does not imply any ACK information.

Figure 5:
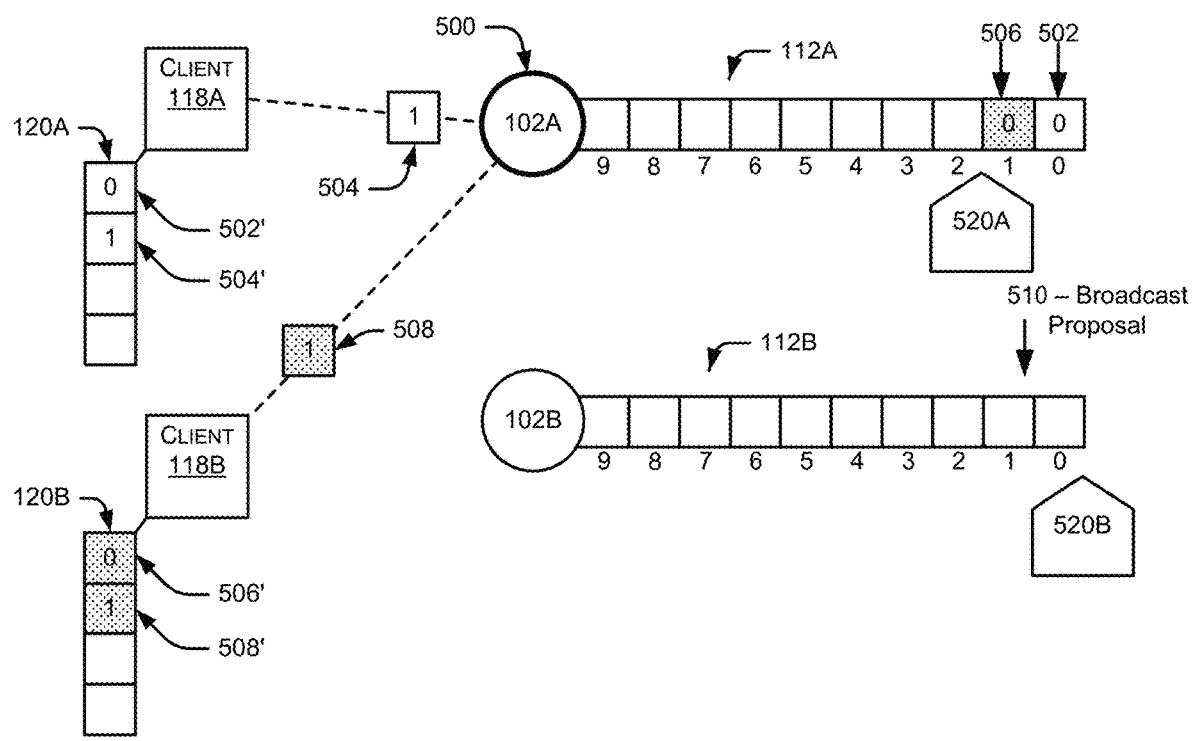
FIG. 5 illustrates sequential reachable slots within a consensus log.

FIG. 5 illustrates sequential reachable slots within a consensus log 112. Sequential reachability is an extension of the notion of a reachable log position. As briefly discussed above, a sequencer process 102, such as sequencer process 102A considers a log position i to be decided with value v after learning, via the consensus dialog between sequencer processes 102, that a write quorum of members of the sequencer processes 102 agree on value v at a log position.

The designation decided$_p$ represents the set of log positions decided by a sequencer process p. For consensus logs 112 that implement an active window with lowest retained log position $A_p$, earlier log positions can be assumed decided so that $\{j|j<A_p\}\in$decided$_p$ without knowing the decided values at those log positions. In conventional consensus logs, each process p may safely assume that the decided value for a log position will never change.

As illustrated in FIG. 5, a consumer 520 that reads from the consensus log 112A associated with sequencer processes 102A is referred to as a witness of the log at the respective sequencer process. For example, consumer 520 is a witness of the consensus log 112A. In some configurations, as discussed above briefly and in more detail below, a consumer/witness 520 is associated with each sequencer process 102. According to some configurations, a consumer 520 is configured to not witness the values of undecided log positions and do not witness the value of a decided log position i before witnessing, in-order, the previously decided log positions j<i. This is to help ensure that the consensus log 112 delivers the same decided values in the same order to all of the consumers 106. For example, consumer 520 will not witness a message received from a client 118 that is out of order.

A process p considers a log position i to be reachable if $\forall(j\le i)$, j$\in$decided$_p$. A sequencer process 102 with no decided slots has no reachable slots. As such there is not always a greatest reachable slot. In some configurations, a lowest unreachable index is identified for process p as the least index i where $\forall(j<i)$, j$\in$decided$_p$. Since there may exist decided log positions at p that are greater than this lowest unreachable index, the lowest unreachable index may be referred to as the gap, and $G_p$ may represent the gap index at p. The lowest unreachable index $G_X$ of an epoch x is the greatest index in $\{G_p|p\in M_x\}$.

At steady state, $G_p$ is known to each sequencer process p but $G_X$ is unknown. Generally, the value of $G_X$ can be inferred by a new leader $L_y$ during state transfer from M. In some examples, $L_y$ may change or delete decided values at log indexes at or above $G_X$ in a new epoch y. As opposed to conventional consensus logs, the consensus logs 112 described herein are directed at ensuring that every reachable log position of every sequencer process 102 of every epoch is also sequentially reachable. As such, a consensus log 112 are gapless and contain values from clients 118 in-order and non-duplicated.

As discussed above with reference to FIG. 4, each message submitted for sequencing within the consensus log 112 by a client 118 has the form ((c, s), m) where m is the message payload, c is the client's unique identifier and s is the sequence number assigned by the client to produce a continuous, monotonic sequence starting at 0. The message header may be referred to as (c, s).

A log 112 maintains sequential reachability if for all process p of all epochs, $\forall (i<G_p)$ where $H_p[i]=(c; s)$ for some c; next($S_p[i][c]$)=s. That is, the next expected message from the same client should be the next expected sequence number. According to examples, the headers of the reachable messages at each process represent a monotonic, continuous sequence starting at 0 from each of the clients 118. In the current example, sequencer process 102A includes a first message 502 received from client 118A and a first message 506 received from client 118B that is placed into consensus log 112A and is expecting a next message from client 118A and client 118B that each has a sequence number of 1 (504, 508). As discussed in more detail below, each sequencer process 102 may implement a witness 520 that maintains egress cursors that indicate what values have been consumed from each of the clients within the consensus log 112.

According to some examples, the consensus log 112 that implements sequential reachability may not expose the message headers to its ultimate consumers 106. As such, the partial function payload$_P$ maps decided log instances in p to their payloads. That is, payload$_P[i]$=m when $D_P[i]$=((c, s), m). Suppose a witness, such as consumer 520A has a function eval that it performs on each message m in sequence. The following pseudo-code illustrates such a witness implemented as a function local to p that is called periodically, such as when any new slot becomes decided at p.

var lowest_unexecuted=0
    function on_any_new_decided ( )
      while (lowest_unexecuted∈dom(payload))
        let m=payload [lowest_unexecuted++]
        exec (m)

If witnesses 520 run in non-sequencer processes, each sequencer process might maintain subscriber sessions and implement a local witness with an eval function that multicasts payloads to those subscribed witness processes over an in-order, reliable medium such as TCP.

The lead sequencer process 500 (e.g., sequencer process 102A in this example), once activated, maintains sufficient information to recognize whether each message and information it receives from a client 118 (e.g., a client envelope) is the next in-order message from that client, or indicates a discontinuity. This information may be represented as a map, such as an ingress map that maps client identifiers to the next-needed sequence number from that client 118. More details on how the ingress map is structured and initialized on activation is described in more detail below.

According to some configurations, each leader sequencer process 102, once activated, maintains a log indicator that indicates a log position in which to place a message received from a client 118. In some examples, each sequencer process 102 maintains a log indicator that identifies a lowest-unassigned variable that holds the lowest log index that has no assigned client envelope, decided or otherwise, from any of the clients 118. If the leader 500 sees a client envelope that it can verify is in-order and non-duplicated, it proposes the new envelope to this lowest-unassigned index and increments the index to the next log position. In the current example, sequencer process 102A has determined that message 502 is to be placed at location 0 of log 112 and proposed in a broadcast proposal 510 to the other sequencer processes 102, and that the lowest-unassigned index is incremented to location 1. The sequencer process 102A has also determined that message 506 is to be placed at location 1 of log 112 and that the lowest-unassigned index is incremented to location 2. More details regarding the cursor lowest-assigned variable are provided below.

Given a properly initialized ingress map and lowest-unassigned, as discussed in more detail below with regard to reconfiguration, incoming client envelopes by the lead sequencer process 500 may be handled correctly. The following example pseudo-code illustrates the operation of a sequencer process 102 receiving a client message. A client message envelope can be represented as ((c, s), m) where (c, s) is the header comprising the client identifier and client-assigned sequence number, and where m is the message payload.

var lowest_unassigned=init_lowest_assigned // initialized on activation
    var ingress=init_ingress_cursors // initialized on activation
      on input ((c, s), m))
      if (c∉dom(ingress)) ingress [c] :=0
      if (s==ingress[c])) // compare actual to needed sequence number
        // Verified continuous, so invoke the protocol proposal mechanisms broadcast (propose ($L_y$, lowest_unassigned, ((c, s), m)))
        ingress [c] :=s+1
        lowest_unassigned++
      else if (s>ingress[c])
        // gap is detected from client sending message
        unicast (c, NACK(c, ingress [c]))

According to some examples, when the sequencer process 102 receives a message that is in-order from the client 118, without a gap, the leader sequencer process 500 stores the entire message including the header into the log. When a gap is detected, the sequencer process 102 may send a NACK message to the client requesting that client to re-send messages in the buffer 306.

In some configurations, leaders 500 may not propose each client message as it arrives. In some configurations, a leader 500 may buffer and batch client messages in a modified propose message that carries a map of log assignments to client envelopes and the recipients may treat that batch as either one consensus problem or a set of individual consensus problems. As illustrated, leader 500 has proposed assignments for the log assignments 502 and 506 to the other sequencer processes 102 (e.g., sequencer process 102B in this example).

Figure 6:
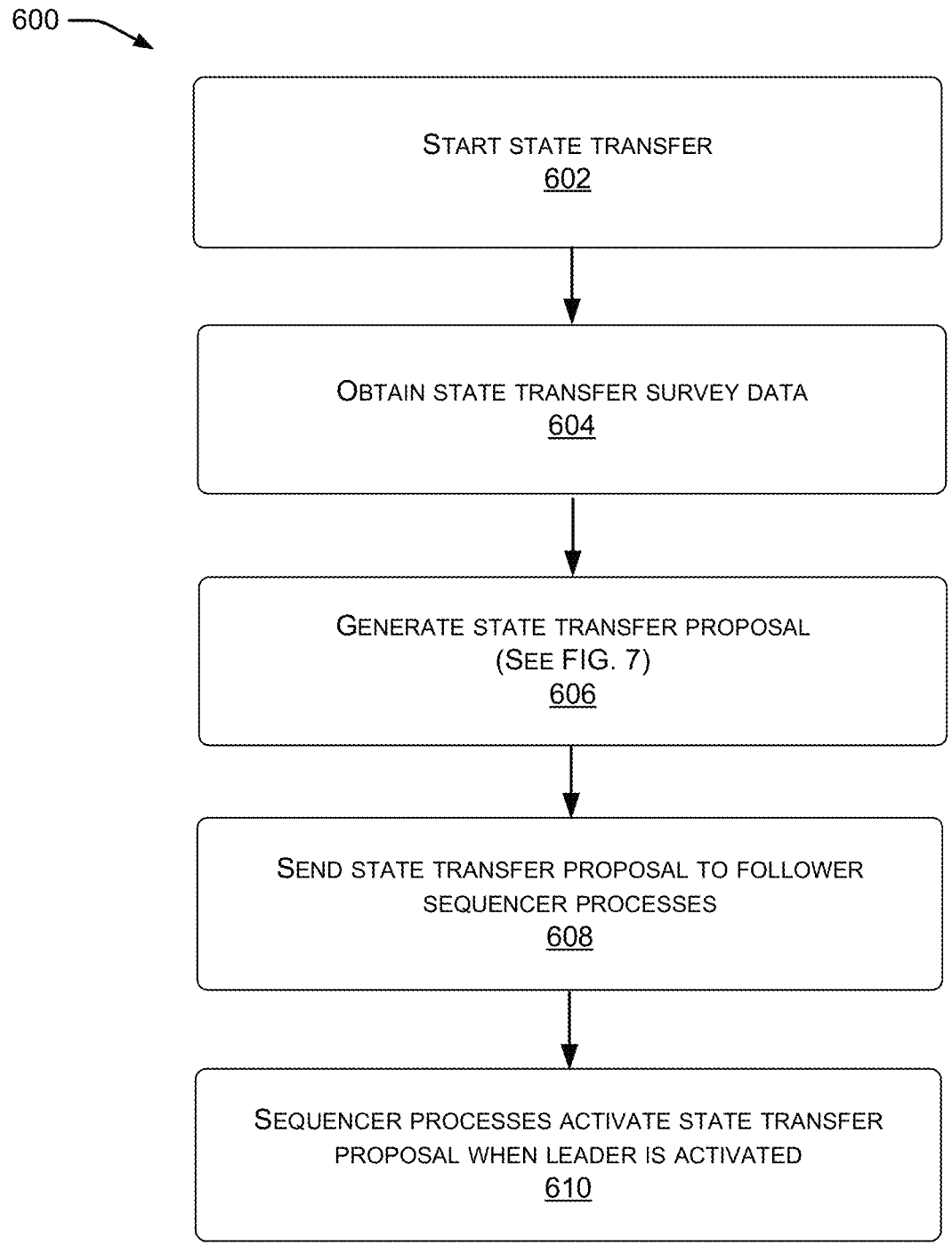
FIG. 6 illustrates a process for reconfiguration of a consensus log.

FIG. 6 illustrates a process 600 for reconfiguration of a fully durable consensus log. A fully durable consensus log is configured to not forget the decided value of any sequentially reachable slot.

At 600, a state transfer phase is started. Upon reconfiguration of the consensus log 112, a state transfer is started. During the state transfer, when a leader $L_y$ is attempting to lead a new epoch y that is a provisional successor to an old epoch x, the leader sends a survey request to the members $M_x$ of the epoch x.

At 602, state transfer survey data 310 is received from the sequencer processes 102. The state transfer survey data 310 may include different data depending on the sequencer protocol used. Generally, the state transfer survey data includes data from each of the sequencer processes 102 that indicate a state of the associated instance of the consensus log for the sequencer process 102.

At 604, a state transfer proposal is generated by the leader. After receiving the state transfer data from the members, the leader can determine $G_X$ (gap (lowest unreachable) index of x when frozen and $F_X$ (frontier of x when frozen), as well as the set $D_X$ (the indexes of potentially-decided slots of x) and $survey_x$ (the values of potentially-decided slots of x). The leader need not learn $A_X$ (the lowest index of the active window) because in this case the whole log prefix is active and $A_X$ is 0. More details are provided below in the discussion of FIG. 7.

At 606, the leader sends a message to the follower sequencer processes proposing the state information learned from the state transfer survey data. In some examples, the leader sends a "propose_successor_state" for the next epoch y and the sequencer processors 102 receiving the propose_successor_state message treat epoch y provided by the new possible leader as a possible successor to epoch x until the sequencer process 102 receives a notification that epoch y has been activated.

At 608, sequencer processes 102 latch to the proposed epoch when a sequencer process 102 receives confirmation of the activated epoch. If a sequencer process has any other possible successors to an epoch (received from other potential leaders), the sequencer process 102 discards/ignores that data and installs the data from $L_y$'s propose_successor_state, voting on it as needed to drive consensus on its proposed log assignments.

Figure 7:
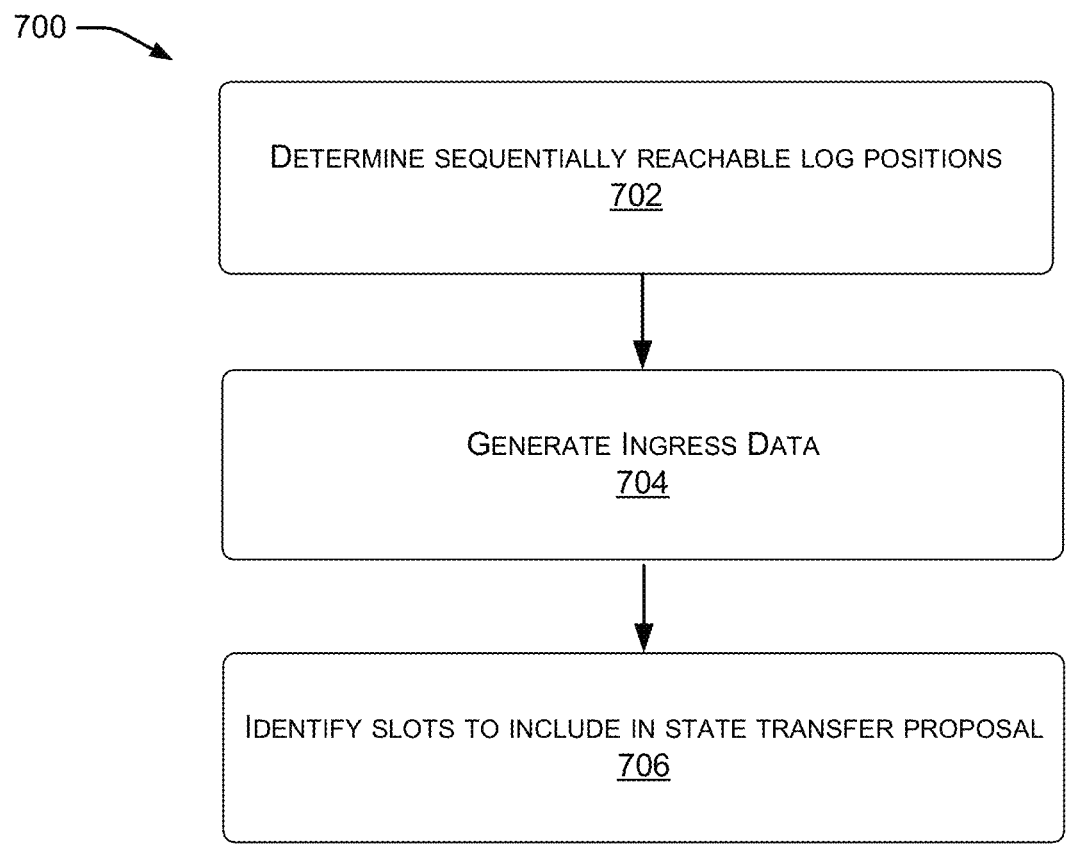
FIG. 7 illustrates a process generating a state transfer proposal.

FIG. 7 illustrates a process 700 generating a state transfer proposal. At 702, sequentially reachable log indexes are determined. In some examples, the new leader includes the log indexes i that are sequentially reachable. The following pseudo-code may be used by the leader to compute the slots and the lowest log position above the state transfer's range:

```
var slots_to_propose={ }
var top_of_range=0 // the known value of A_X
for (; top_of_range<G_X; top_of_range++)
    slots_to_propose [top_of_range] :=survey [top_of_range]
    make_propose_successor_state    (top_of_range,slots_to_propose)
```

At 704, the leader computes ingress map data. Generation of the ingress map data as discussed above helps to ensure that the leader proposes in-order, non-duplicated, gapless messages. As discussed, the ingress map maps client identifiers to the next-needed sequence number from that client.

At 706, slots are identified to include in the state transfer proposal. The following pseudo-code illustrates how the leader $L_y$ might collect the slots to propose in a propose_successor_state message and also identify the lowest log position above those proposed log assignments. At loop termination, these will be found in slots_to_propose and lowest_unassigned, respectively. The loop also computes (and makes use of) a set of ingress cursors 108 which can be found in ingress at loop termination.

```
var slots_to_propose={ }
var ingress={ }
var lowest_unassigned=0 // the known value of A_X
for (; lowest_unassigned<G_X; lowest_unassigned++)
    slots_to_propose   [lowest_unassigned]   :=survey [lowest_unassigned]
    let ((c, s), m)=survey [lowest_unassigned]
    ingress [c] :=s+1
    make_propose_successor_state    (lowest_unassigned, slots_to_propose)
```

Figure 8:
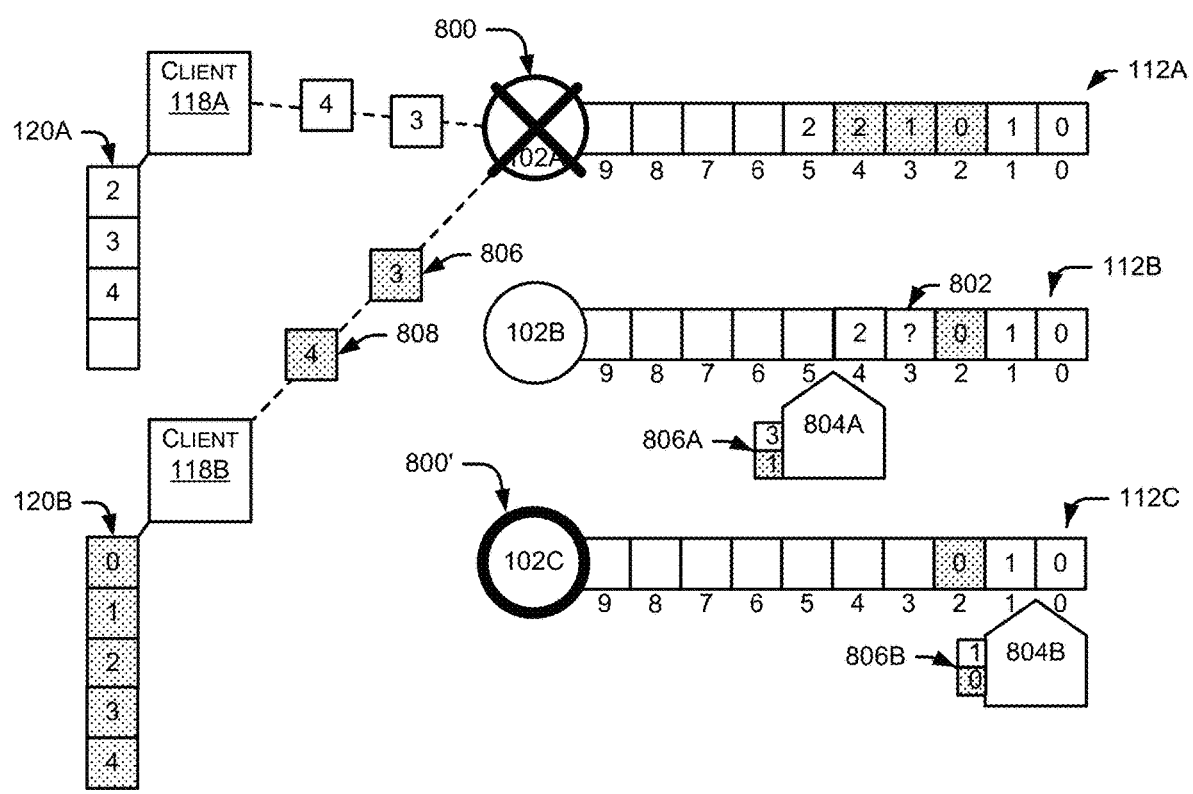
FIG. 8 illustrates the use of ingress cursors and egress cursors.

FIG. 8 illustrates the use of ingress cursors 108 and egress cursors 114. As illustrated, FIG. 8 shows two clients 118A and 118B sending messages to a leader 800 for inclusion in a consensus log 112. Conventionally, when a leader fails, such as leader 800 fails (as indicated by the X over sequencer processor 102A) a conventional sequencer (Multi-Paxos, for example) designates a new leader among the remaining viable services, and the sender clients asynchronously learn the identity of the new leader. The conventional sender clients dump their resend buffers 120 to the new leader. The new leader determines, from the survey results, what the other sequencer processors 102 know in terms of their assignments to the log positions of their respective consensus logs. The new leader collects all the data it can from the client senders and from the other services, blindly assigning duplicate messages and out-of-order messages to next available log positions in the consensus log as it witnesses the messages during the restoration, for example. The result, however, is not reliable, in-order messaging.

In FIG. 8, the sequencer protocol 100 described herein improves upon the conventional pitfalls of conventional sequencer processes 102. When the leader 800 fails, some assignments may have been partially shared (e.g., one or more of the non-leader sequences have not received the assignments), and some assignments may not have been shared to the non-leader sequencer processes. This is because the non-leader sequencer processes 102B, 102C may not have the assignments yet, and the leader 800 has failed. In other examples, a partial number of the sequencer processes 102 may have received assignments, whereas others have not. The survey phase of state transfer is designed to learn about any of these partially shared assignments that might possibly have been decided at some sequencer process 102. The follower services 102B, 102C have no way to proceed beyond log positions already decided by a quorum until a new leader is designated.

As illustrated, sequencer process 102B with an executor cursor is facing a gap 802 in the consensus log 112B. In contrast to conventional methods, the example sequencer protocol 100 now applies a technique for providing reliable, in-order messaging. A sequencer process 102C that wants to be a new leader 800' first establishes a survey of the information available from the remaining sequencer processes 102, such as sequencer processor 102B, in terms of the messages assigned to log positions of the services' respective instances of the consensus log 112B, including its own information. The new leader 800' also collects available data by performing a survey from the clients 118A, 118B by performing a survey or some other mechanism.

The following illustration of FIG. 8 shows a modified executor witnesses 804A, 804B that, in addition to generating ACKs as before, also implements egress cursors 806A, 806B. The egress cursors 806 record the next-needed sequence number from each client 118 at the point of the lowest-unexecuted cursor. The egress cursors 806 may differ from the ingress cursors (maintained by the lead sequencer process) because the lowest-unexecuted cursor is typically lower than the leader's lowest-unassigned cursor.

In some configurations, each egress cursor 804 tracks the next expected message from each client 118 for execution, in-order of sequence number for that client. The instance of the egress cursor 804 associated with each consensus log 112 tracks a next expected sequence number, per client 118, to be encountered for execution as the executor cursor 314, travels from right to left along the log positions of the consensus log 112 as shown. (The right to left motion is just for the sake of diagrammatic description of FIG. 8).

According to some examples, to reconfigure logs, the information collected in the state-transfer survey includes information about egress cursors 804 obtained from the executor witnesses 804 associated with the sequencer processes 102 which the new leader 800' uses to initialize its ingress cursors without a full history of the log 112. In some configurations, a sequencer process 102 (that may be the new leader) sends the other sequencer processes 102 a propose_successor_state proposal message that includes information about egress cursors 804 that is used by the follower sequencer processes to initialize their own egress cursors without having witnessed the deleted portion of the log. When the sequencer process 102 is designated as the new leader, the follower sequencer processes can use the stored information received from the leader.

As discussed, the log 112 is responsible for generating ACK messages to clients 118 after their envelopes have become sequentially reachable. Any sequencer processes 102 may also perform this task, but at least one sequencer process performs this to support client buffer management. In some configurations, the leader 800 generates ACKs. In some configurations, in addition to the sequencer process 102 designated as the leader, each sequencer process 102 implements a witness 804 as illustrated. According to some examples, the witness 804 may suppress or enable ACK-generation on different processes at different times. The following pseudo code illustrates an example executor witness to generate ACKs:

```
var lowest_unexecuted=0
var egress={ }
function on_any_new_decided (should_ack)
  while (lowest_unexecuted∈dom(decided))
    let ((c, s), m)=decided [lowest_unexecuted++]
    if (should_ack) unicast (c, ACK(c, s+1))
    egress [c]=s+1
```

Figure 9:
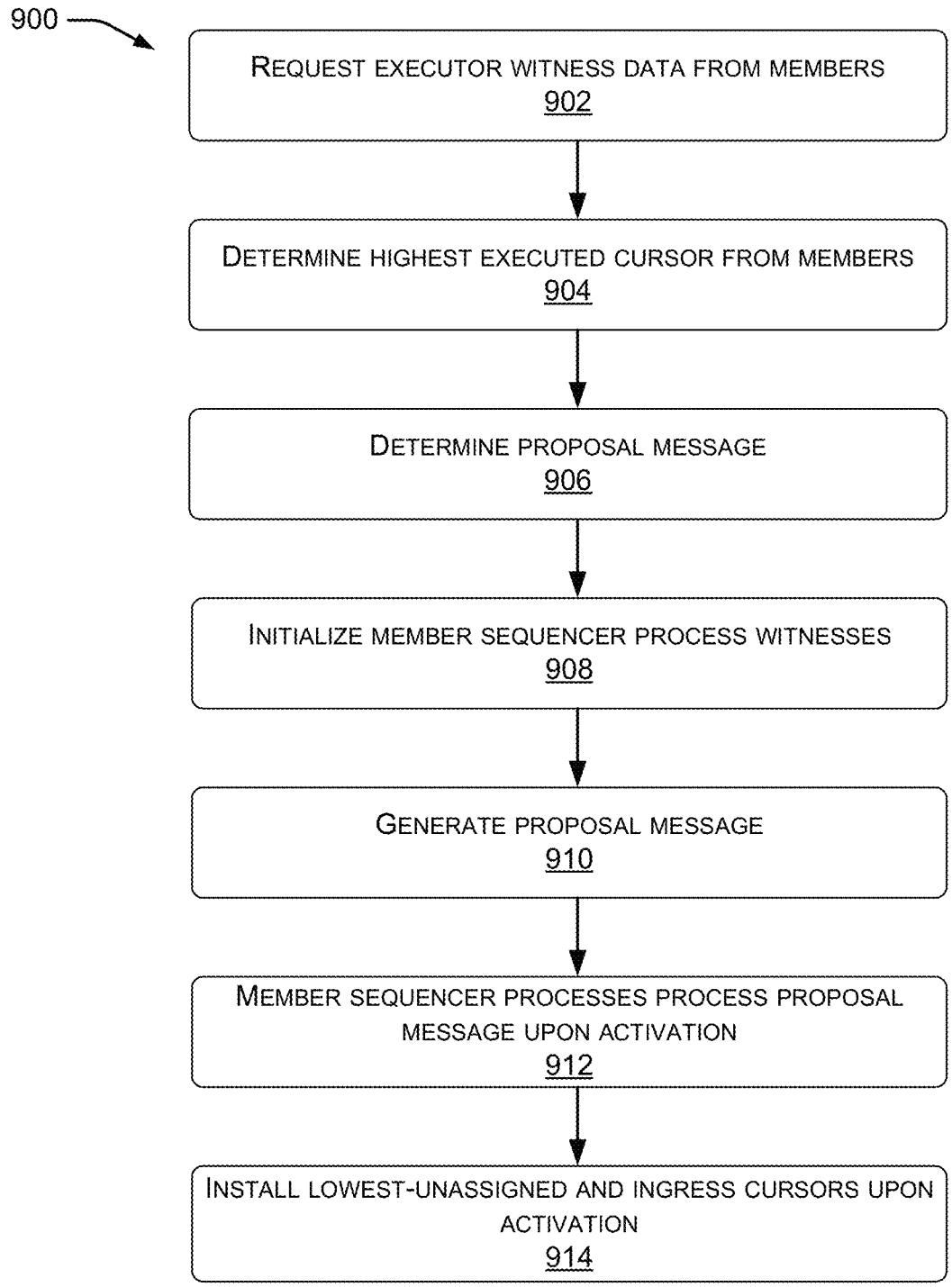
FIG. 9 illustrates reconfiguration to use and share egress cursors.

FIG. 9 illustrates reconfiguration to use and share egress cursors 114. According to some examples, a consensus log 112 may not maintain a full history. To assist in adding sequencer processes 102 without providing a fully history, the following process 900 may be used.

At 902, the leader Ly asks the members of prior epoch x for state transfer (e.g., using a Paxos 1a message), each recipient sequencer processor 102 includes in its response a state of its executor witness 120, including the lowest-unexecuted index (i) and (κ) is the egress-cursor map.

At 904, a highest executor cursor from the survey responses is determined. In information learned from a conventional state-transfer survey, the leader Ly computes the highest executor cursor. In some examples, the leader Ly may order the results That is: (i, κ)<(i', κ') ⇔ i<i. For any two states, (i, κ), (i', κ') learned during the same survey of $M_X$, i=i' ⇒ κ=κ'. In the base case where the prior epoch is the null epoch, the maximal snapshot is assumed to be (0, { }).

At 906, the propose_successor_state message is determined. With fully-durable logs, the leader sequencer process computation of propose_successor_state proposal began at log positon 0 with an empty map of ingress cursors. When the entire consensus log is not available, the following mechanism may be use dot handle the missing prefix of messages. The following assumes the elements of the (i, κ) are max_indexand max_egress, respectively. The following pseudo code illustrates the leader Computing State-Transfer Assignments and Ingress Cursors using Egress Cursors:

```
var slots_to_propose={ }
var ingress={ }
var lowest_unassigned=A_X
for (; lowest_unassigned<max_index; lowest_unassigned++)
  slots_to_propose [lowest_unassigned] :=survey [lowest_unassigned]
for (c∈dom(max_egress))
  // initialize ingress from max_egress
  ingress [c] :=max_egress [c]
for (; lowest_unassigned<G_X; lowest_unassigned++)
  slots_to_propose [lowest_unassigned] :=survey [lowest_unassigned]
  let ((c, s), m)=survey [lowest_unassigned]
  ingress [c]×:=s+1
make_propose_successor_state (lowest_unassigned, slots_to_propose)
```

It can be assumed that $0 \le A_X \le max\_index \le G_X \le F_X$. There are three index ranges to consider. For the range [0 . . . $A_X$) there may not be any data for slots below $A_X$, which means no envelope data for the messages sent by the clients 118. That is why max_index is greater than or equal to $A_X$. For the range [$A_X$ . . . max_index) the payload data for these slots can be included in the proposal for the initial log assignments. In some examples, the client information normally learned from the envelopes between 0 and max_index has been compressed into max_egress. For the range [max_index . . . $G_X$), the ingress cursors are updated with data from the envelopes associated with the slots.

At 908, the member sequencer processes 102 of the successor epoch initialize their executor witnesses 110 appropriately given the information in the propose_successor_state message. In some examples, some members of $M_X$ may be new to the log and have no prior executor-witness state.

At 910, the propose_successor_state message is generated. In some configurations, the propose_successor_state message includes the maximal epoch the leader successor process learned during its state-transfer survey of the prior epoch and used to initialize its loop to construct the propose_successor_state message. According to some examples, the call to make_propose_successor_state may be replaced with the following:

```
var slots_to_propose={ }
var ingress={ }
var lowest_unassigned=max_index // derived from survey
for (c∈dom(max_egress))
  ingress [c] :=max_egress [c] // initialize ingress from max_egress
for (; lowest_unassigned<G_x; lowest_unassigned++)
  slots_to_propose [lowest_unassigned] :=survey [lowest_unassigned]
  let ((c, s), m)=survey [lowest_unassigned]
  ingress [c] :=s+1
make_propose_successor_state (lowest_unassigned, slots_to_propose, max_index, max_egress)
```

At 912, the propose_successor_state message is processed by sequencer processes 102 upon activation of an epoch. When a sequencer process 102 learns, by witnessing the activation of an epoch (as described above, the sequencer process 102 initializes (perhaps re-initializing) its executor witness 110 with the lowest-unexecuted index and egress-cursors map found in the propose_successor_state message associated with the activated epoch.

At 914, the leader installs, upon activation, the lowest-unassigned and ingress cursors it learned while computing propose_successor_state as the cursors it will use in handling client requests. The leader can also generate gratuitous ACK/NACK messages to all clients based on the contents of the ingress cursors. In some examples, the following logic can be executed as the first step whenever a sequencer process 102 learns that a proposed successor state has been activated, before processing any of the slots_to_propose. The variables lowest_unexecuted and egress that it modifies are those used by the executor witness.

```
function on_activation (make_propose_successor_state
    (lowest_unassigned, slots_to_propose, max_index,
    max_egress))
    if (max_index>lowest_unexecuted)
        lowest_unexecuted :=max_index
        egress :=max_egress
```

Figure 10:
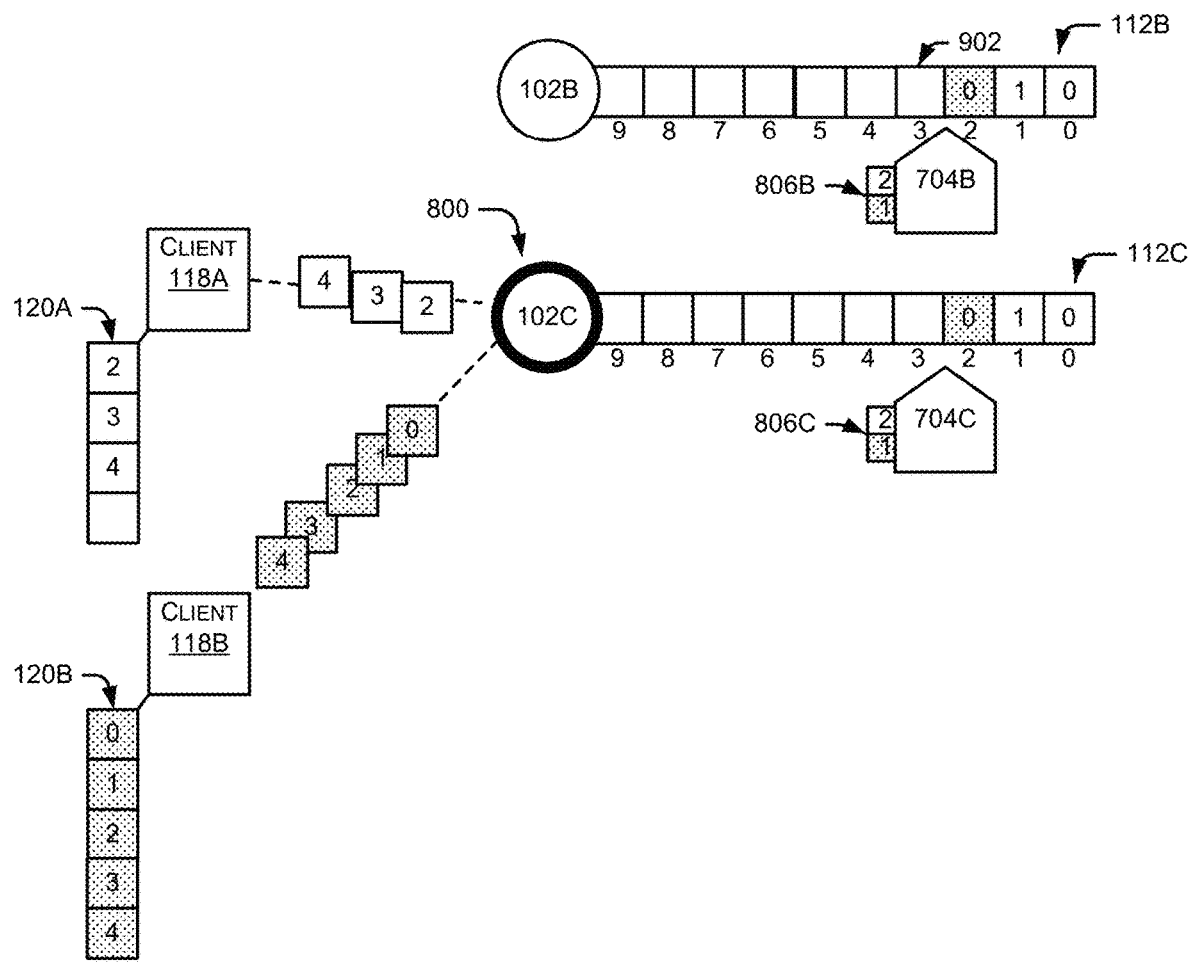
FIG. 10 illustrates a new leader starting an epoch.

FIG. 10 illustrates a new leader starting an epoch. As illustrated, clients 118A and 118B have provided sequencer process 102C the contents of buffers 120A, and 120B. As illustrated, the sequencer process 102C that has become the new leader has obtained the messages from clients 118 that were within buffers, along with ingress cursors and egress cursors from the remaining sequencer processes 102 in-order to generate the next epoch of the consensus log 112 that is in-order, non-duplicated, and fault tolerant.

Figure 11:
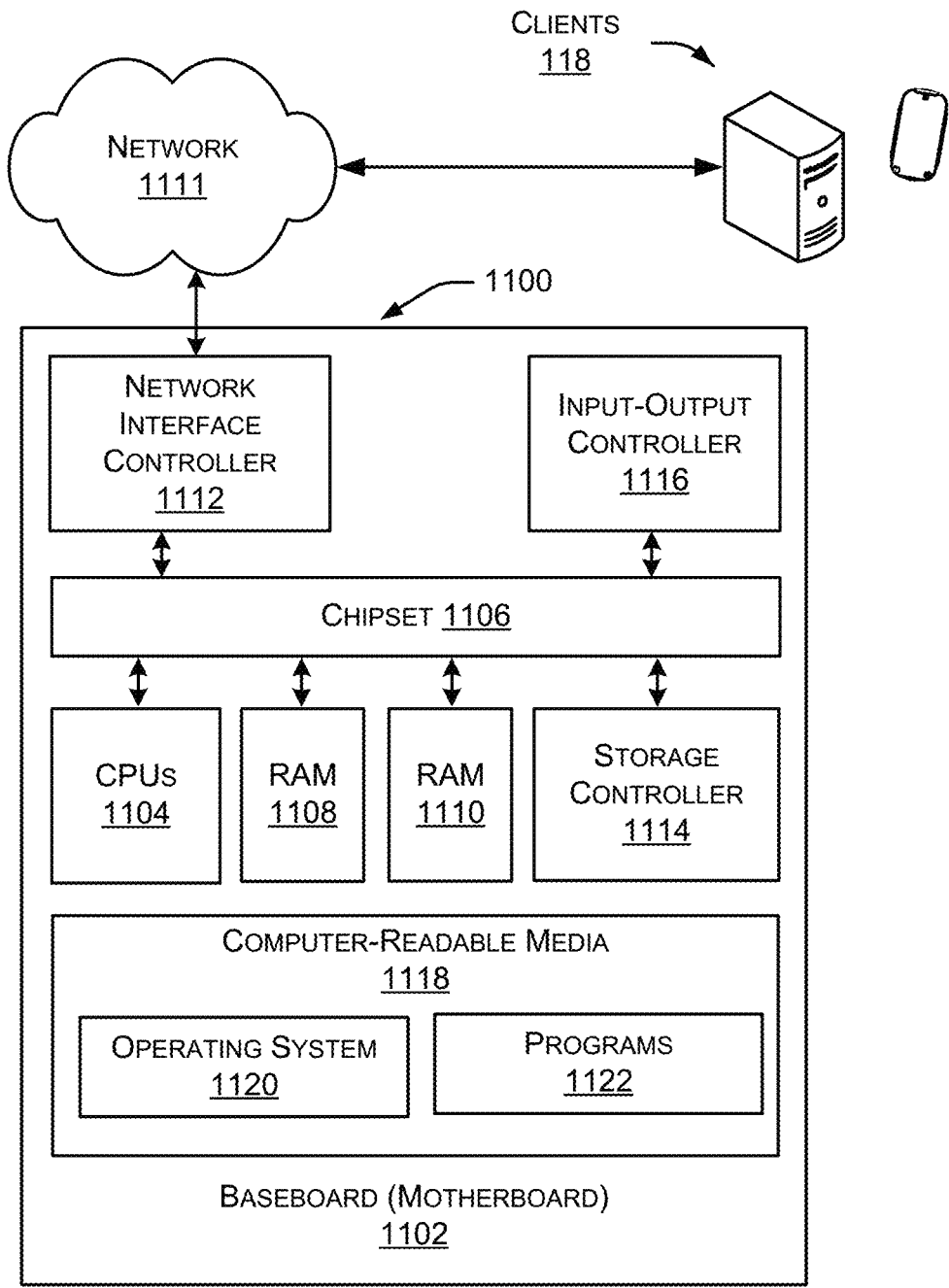
FIG. 11 illustrates an example computing device suitable for hosting the subject matter described herein.

FIG. 11 illustrates an example computer architecture 1100 for a server computing device, capable of executing program components for implementing the functionality described above. The computer architecture shown in FIG. 11 illustrates a conventional server computer, workstation, desktop computer, laptop, tablet, network appliance, e-reader, smart phone, or other computing device, and can be utilized to execute any of the software components presented herein. The server computing device implementing 102, 106 may, in some examples, correspond to a physical server, and may comprise networked devices such as servers, switches, routers, hubs, bridges, gateways, modems, repeaters, access points, etc.

The computing device includes a baseboard 1102, or "motherboard," which can be a printed circuit board to which a multitude of components or devices can be connected by way of a system bus or other electrical communication paths. In one illustrative configuration, one or more central processing units ("CPUs") 1104 operate in conjunction with a chipset 1106 via the system bus, controlled by one or more input/output controllers 1116. The CPUs 1104 can be standard programmable processors that perform arithmetic and logical operations necessary for the operation of the computing device.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computing device. The chipset 1106 can further provide an interface to a computer-readable storage medium such as a read-only memory ("ROM") 1110 or non-volatile RAM ("NVRAM") for storing basic routines that help to startup the computing device and to transfer information between the various components and devices. The ROM 1110 or NVRAM can also store other software components necessary for the operation of the computing device in accordance with the configurations described herein.

The computing device can operate in a networked environment using logical connections to remote computing devices and computer systems through a network, such as the network 1111. The chipset 1106 can include functionality for providing network connectivity through a network interface controller (NIC) 1112, such as a gigabit Ethernet adapter. The NIC 1112 is capable of connecting the computing device to other computing devices over the network 1111 (and/or 104). It should be appreciated that multiple NICs 1112 can be present in the computing device, connecting the computer to other types of networks and remote computer systems.

The computing device can be connected to a data storage device 1118 that provides non-volatile data storage for the computer. The storage device 1118 can store an operating system 1120, programs 1122, and data, which have been described in greater detail herein. The storage device 1118 can be connected to the computing device through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computing device can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device can further read information from the storage device 1118 by detecting the physical states or characteristics of one or more particular locations within the physical storage units.

In addition to the mass storage device 1118 described above, the computing device can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device. In some examples, the operations performed by the network 1111 or 104, and or any components included therein, may be supported by one or more devices. Stated otherwise, some or all of the operations performed by the network 1111 or 104, and or any components included therein, may be performed by one or more computing devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computing device. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1118 can store other system or application programs and data utilized by the computing device.

In one embodiment, the storage device 1118 or other computer-readable storage media is encoded with computer-executable instructions which, when loaded into the computing device, transform the computer from a general-purpose computing system into a special-purpose computer capable of implementing the embodiments described herein. These computer-executable instructions transform the computing device by specifying how the CPUs 1104 transition between states, as described above. According to one embodiment, the computing device has access to computer-readable storage media storing computer-executable instructions which, when executed by the computing device, perform the various processes described above with regard to FIGS. 1-10. The computing device can also include computer-readable storage media having instructions stored thereupon for performing any of the other computer-implemented operations described herein.

The computing device can also include the one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computing device might not include all of the components shown in FIG. 11, can include other components that are not explicitly shown in FIG. 11, or might utilize an architecture completely different than that shown in FIG. 11.

As described herein, the computing device may also comprise one or more of a source device, an intermediary device, and/or a destination or client device 118. The computing device may include one or more hardware processors 1104 (processors) configured to execute one or more stored instructions. The processor(s) 1104 may comprise one or more cores. Further, the computing device may include one or more network interfaces configured to provide communications between the computing device and other devices, such as the communications described herein as being performed by the source device, intermediary device, and destination device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method, comprising:
receiving, at one or more sequencer processes, a first message from a first client to be placed within a consensus log that includes slots and implements a consensus protocol, wherein the consensus log is implemented by the one or more sequencer processes that each implement the consensus protocol and each maintain a copy of the consensus log that includes at least an active portion of the consensus log that is associated with a portion of the consensus log in which consensus decisions are actively being decided by the one or more sequencer processes;
accessing a first next message indicator, from next message indicators, that indicates a next expected message that is to be received from the first client, wherein the next message indicators includes at least the first next message indicator;
determining that the first message is the next expected message from the first client based, at least in part, on the first next message indicator;
accessing a log indicator that indicates a log position to place the first message within the consensus log;
assigning, based at least in part on determining that the first message is the next expected message, the first message to the consensus log at the log position; and
updating the log indicator to a next log position in the consensus log.

2. The method of claim 1, wherein determining that the first message is the next expected message comprises determining that the next message is in a sequential order from the first client and is non-duplicated.

3. The method of claim 1, further comprising:
receiving, at the one or more sequencer processes, a second message to be placed within the consensus log;
determining that the second message is in a non-sequential order from the first client; and
preventing the second message to be placed within the consensus log.

4. The method of claim 1, wherein assigning the first message to the consensus log comprises storing a sequence number, a client identifier, and data associated with the first message received from the first client.

5. The method of claim 1, further comprising:
determining to reconfigure the consensus log;
receiving survey results from one or more other sequencer processes, wherein the survey results include current log assignments and egress cursors information for one or more instances of the consensus log maintained by the one or more other sequencer processes, and data associated with ingress cursors;
generating, based at least in part on the survey results, a proposal message to send to the one or more other sequencer processes, wherein the proposal message includes alternative log assignments for a new epoch to replace the current log assignments, including zero or more decided slots for at least one of the one or more other sequencer processes, associated with a current epoch; and
transmitting the proposal message to the one or more other sequencer processes.

6. The method of claim 5, further comprising determining that the new epoch is activated, and using the alternative log assignments as the current log assignments.

7. The method of claim 1, further comprising:
storing alternative log assignments received from one of the sequencer processes in addition to current log assignments, wherein the alternative log assignments are associated with a successor epoch of the consensus log;
determining that a new epoch of the consensus log is to be activated; and
activating the new epoch of the consensus log.

8. The method of claim 1, further comprising:
at least partly in response to being designated as a leader sequencer process, receiving copies of messages from buffers of one or more clients that include the first client, and
filtering the copies of messages to repopulate the consensus log with messages from the clients, the messages in-order from the clients.

9. A system comprising:
multiple processors; and
one or more non-transitory computer-readable media storing computer-executable instructions that, when executed by at least one of the multiple processors, cause at least one of the multiple processors to perform actions including:
receiving, at one or more sequencer processes, a first message from a first client of one or more clients to be placed within a consensus log that includes slots and implements a consensus protocol, wherein the consensus log is implemented by the one or more sequencer processes that each implement the consensus protocol and each maintain a copy of the consensus log;
accessing a first next message indicator, from next message indicators, that indicates a next expected message that is to be received from the first client, wherein the next message indicators includes at least the first next message indicator and a second next message indicator that indicates a second next expected message that is to be received from a second client;
determining that the first message is the next expected message from the first client based, at least in part, on the first next message indicator;
accessing a log indicator that indicates a log position to place the first message within the consensus log; and
assigning, based at least in part on determining that the first message is the next expected message, the first message to the consensus log at the log position.

10. The system of claim 9, wherein determining that the first message is the next expected message comprises determining that the next message is in a sequential order from the first client and is non-duplicated.

11. The system of claim 9, wherein the actions include:
receiving, at the one or more sequencer processes, a second message to be placed within the consensus log;
determining that the second message is in a non-sequential order from the first client; and
preventing the second message to be placed within the consensus log.

12. The system of claim 9, wherein the actions include:
determining to reconfigure the consensus log;
receiving survey results from one or more other sequencer processes, wherein the survey results include current log assignments and egress cursors information for one or more instances of the consensus log maintained by the one or more other sequencer processes, and data associated with ingress cursor information;
generating, based at least in part on the survey results, a proposal message to send to the one or more other sequencer processes, wherein the proposal message includes alternative log assignments for a new epoch to replace the current log assignments, including zero or more decided slots for at least one of the one or more other sequencer processes, associated with a current epoch; and
transmitting the proposal message to the one or more other sequencer processes.

13. The system of claim 12, wherein the actions include determining that the new epoch is activated and using the alternative log assignments as the current log assignments.

14. The system of claim 9, wherein the actions include:
storing alternative log assignments received from one of the sequencer processes in addition to current log assignments, wherein the alternative log assignments are associated with a successor epoch of the consensus log;
determining that a successor epoch of the consensus log is to be activated; and
activating the successor epoch of the consensus log.

15. The system of claim 9, wherein the actions include:
at least partly in response to being designated as a leader sequencer process, receiving copies of messages from buffers of the one or more clients, and
filtering the copies of messages to repopulate the consensus log with messages from the clients, the messages in-order according to each respective sequence assigned to the messages of the one or more clients.

16. One or more non-transitory computer-readable media storing computer-executable instructions that, when executed by one or more processors, cause the one or more processors to perform operations comprising:
receiving, at one or more sequencer processes, a first message from a first client to be placed within a consensus log that includes slots and implements a consensus protocol, wherein the consensus log is implemented by the one or more sequencer processes that each implement the consensus protocol and each maintain a copy of the consensus log;

accessing a first next message indicator, from next message indicators, that indicates a next expected message that is to be received from the first client, wherein the next message indicators includes at least the first next message indicator;

determining that the first message is the next expected message from the first client based, at least in part, on the first next message indicator;

accessing a log indicator that indicates a log position to place the first message within the consensus log;

assigning, based at least in part on determining that the first message is the next expected message, the first message to the consensus log at the log position; and updating the log indicator to a next log position in the consensus log.

17. The one or more non-transitory computer-readable media of claim 16, the operations comprising:

receiving, at the one or more sequencer processes, a second message to be placed within the consensus log;

determining that the second message is in a non-sequential order from the first client; and preventing the second message to be placed within the consensus log.

18. The one or more non-transitory computer-readable media of claim 16, wherein assigning the first message to the consensus log comprises storing a sequence number, a client identifier, and data associated with the first message received from the first client.

19. The one or more non-transitory computer-readable media of claim 16, wherein the operations include:

determining to reconfigure the consensus log;

receiving survey results from the one or more sequencer processes, wherein the survey results include current log assignments and egress cursors information for one or more instances of the consensus log maintained by the one or more sequencer processes, and data associated with ingress cursor;

generating, based at least in part on the survey results, a proposal message to send to the one or more sequencer processes, wherein the proposal message includes alternative log assignments for a new epoch to replace the current log assignments, including one or more decided slots for at least one of the one or more sequencer processes, associated with a current epoch; and transmitting the proposal message to the one or more sequencer processes.

20. The one or more non-transitory computer-readable media of claim 16, wherein the operations include:

storing alternative log assignments received from one of the sequencer processes in addition to current log assignments, wherein the alternative log assignments are associated with a new epoch of the consensus log;

determining that the new epoch of the consensus log is to be activated; and activating the new epoch of the consensus log.

* * * * *